(12) United States Patent
Tamura

(10) Patent No.: US 7,783,385 B2
(45) Date of Patent: Aug. 24, 2010

(54) NETWORK SYSTEM, MOBILE DEVICE, METHOD OF CONTROLLING SAME, AND COMPUTER PROGRAM

(75) Inventor: Yosuke Tamura, Tokyo (JP)

(73) Assignee: Sony Corporation, Tokyo (JP)

(*) Notice: Subject to any disclaimer, the term of this patent is extended or adjusted under 35 U.S.C. 154(b) by 1114 days.

(21) Appl. No.: 11/422,494

(22) Filed: Jun. 6, 2006

(65) Prior Publication Data

US 2006/0293793 A1 Dec. 28, 2006

(30) Foreign Application Priority Data

Jun. 9, 2005 (JP) ............................. 2005-170173

(51) Int. Cl.
| | |
|---|---|
| G08B 13/00 | (2006.01) |
| G08B 13/19 | (2006.01) |
| G08B 13/193 | (2006.01) |
| G08B 13/194 | (2006.01) |
| G08B 25/10 | (2006.01) |
| G06F 19/00 | (2006.01) |

(52) U.S. Cl. .................... 700/248; 340/541; 340/545.2; 340/565; 379/44; 700/245; 700/258; 700/259; 901/1; 901/8

(58) Field of Classification Search ......... 700/248–249, 700/245, 258–259; 340/522, 541, 545.2, 340/565; 379/44; 901/1, 8
See application file for complete search history.

(56) References Cited

U.S. PATENT DOCUMENTS

| | | | | |
|---|---|---|---|---|
| 4,857,912 A | * | 8/1989 | Everett et al. ............... | 340/508 |
| 5,202,661 A | * | 4/1993 | Everett et al. ............... | 340/522 |
| 5,446,445 A | * | 8/1995 | Bloomfield et al. ......... | 340/521 |
| 5,475,365 A | * | 12/1995 | Hoseit et al. ................. | 340/522 |
| 6,665,537 B1 | * | 12/2003 | Lioy ........................ | 455/435.1 |
| 7,030,757 B2 | * | 4/2006 | Matsuhira et al. ........... | 340/541 |
| 7,047,108 B1 | * | 5/2006 | Rainier et al. ............... | 700/245 |
| 7,480,395 B2 | * | 1/2009 | Parunak et al. .............. | 382/103 |
| 7,616,961 B2 | * | 11/2009 | Billhartz .................. | 455/452.2 |
| 2003/0154262 A1 | * | 8/2003 | Kaiser et al. ................. | 709/219 |
| 2003/0228035 A1 | * | 12/2003 | Parunak et al. .............. | 382/107 |
| 2004/0203820 A1 | * | 10/2004 | Billhartz .................. | 455/452.1 |
| 2006/0193316 A1 | * | 8/2006 | Allen ........................ | 370/389 |
| 2006/0253885 A1 | * | 11/2006 | Murphy et al. .............. | 725/105 |
| 2009/0303042 A1 | * | 12/2009 | Song et al. .................. | 340/566 |

FOREIGN PATENT DOCUMENTS

| | | |
|---|---|---|
| JP | 7-134031 | 5/1995 |
| JP | 2003-044974 | 2/2003 |
| JP | 2004-260526 | 9/2004 |
| JP | 2005-025516 | 1/2005 |

* cited by examiner

Primary Examiner—Khoi Tran
Assistant Examiner—Dale Moyer
(74) Attorney, Agent, or Firm—K&L Gates LLP

(57) ABSTRACT

A network system including a plurality of mobile devices is provided. The plurality of mobile devices each have a sensor function and a wireless communication function, the mobile devices communicating sensor information about a target with one another and tracking the target; a target searching section configured to obtain sensor information while the plurality of the mobile devices move and for reporting the sensor information among the mobile devices by wireless communication; a target focusing section configured to, in response to one of the mobile devices detecting a target, focus a sensor on the target in cooperation with mobile devices adjacent to the mobile device detecting the target; and a target surrounding section configured to surround the target by using a plurality of mobile devices that focus their sensors on the same target.

35 Claims, 31 Drawing Sheets

FIG. 1
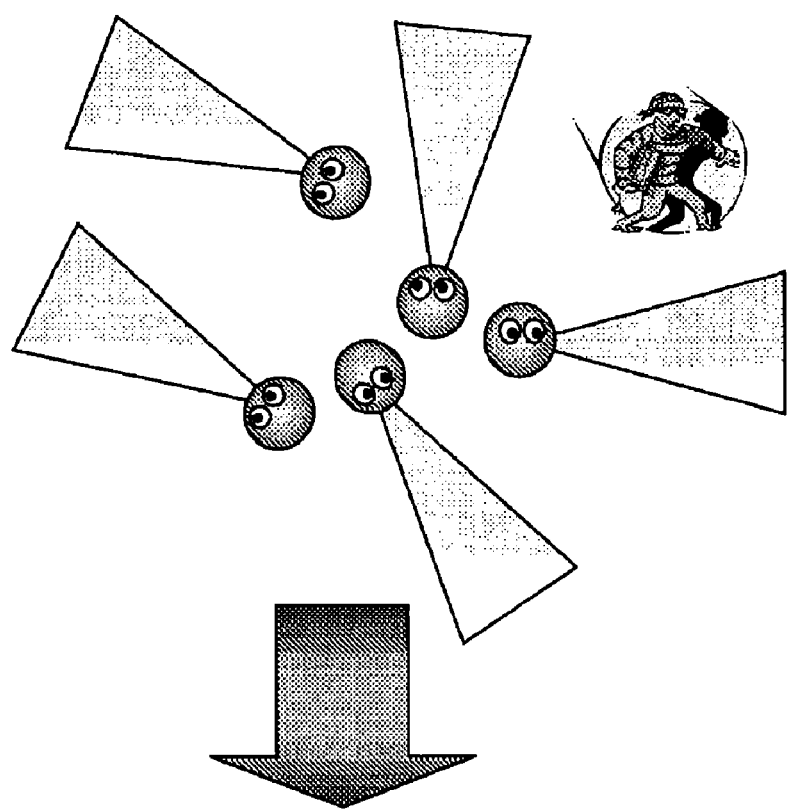
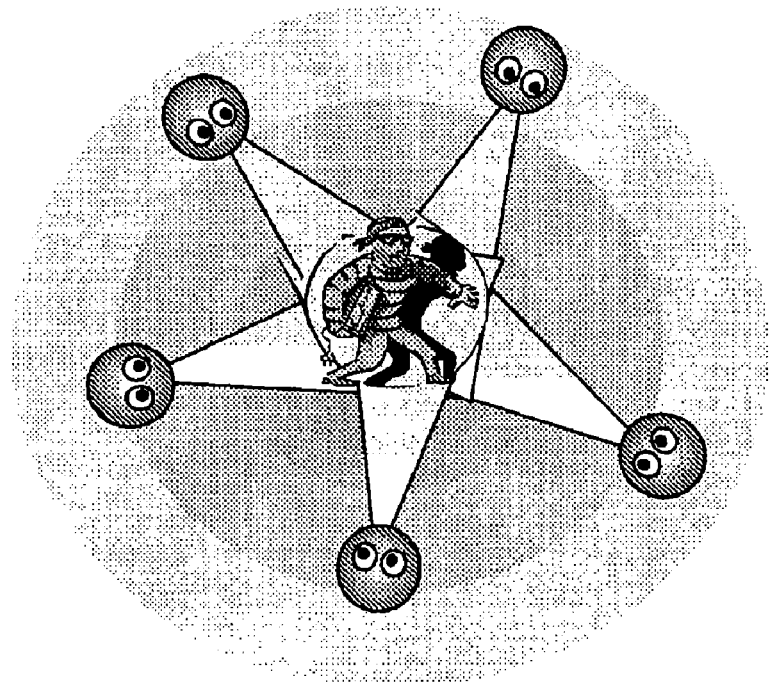

FIG. 5
(1) 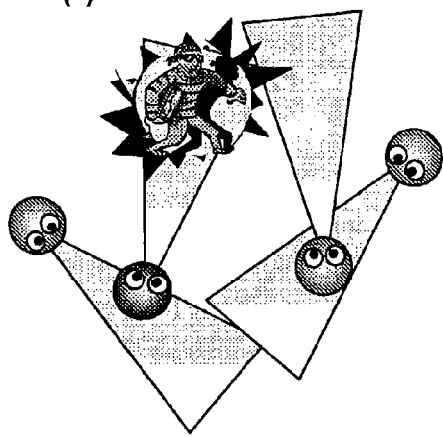
(2) 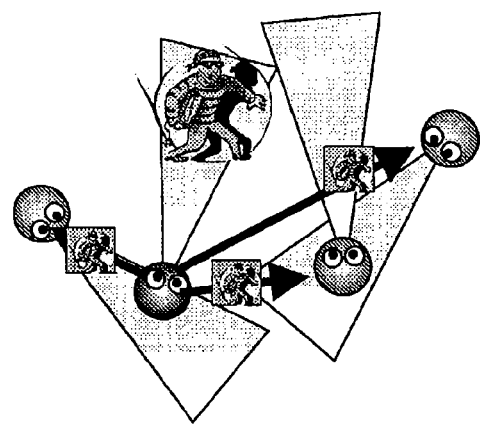
(3) 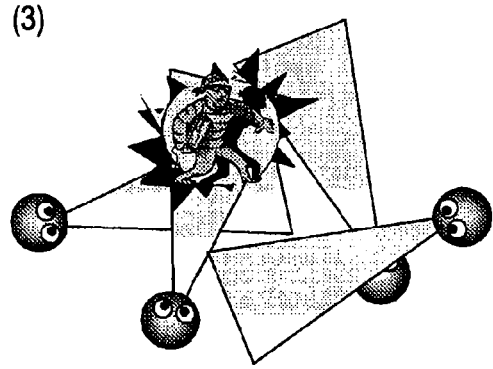
(4) 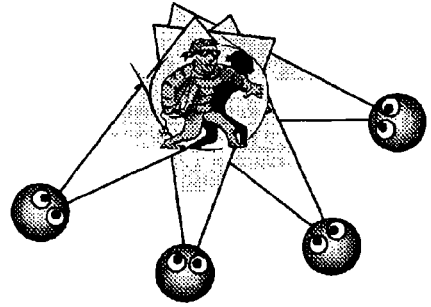

NETWORK SYSTEM, MOBILE DEVICE, METHOD OF CONTROLLING SAME, AND COMPUTER PROGRAM

CROSS REFERENCES TO RELATED APPLICATIONS

The present application claims priority to Japanese Patent Application JP 2005-170173 filed in the Japanese Patent Office on Jun. 9, 2005, the entire contents of which are incorporated herein by reference.

BACKGROUND

The present application relates to a network system in which sensor data obtained by individual mobile devices are shared on a network constructed in such a manner that the plurality of mobile devices each having a sensor function and a wireless communication function are arranged in a distributed manner, to a mobile device, to a method of controlling the mobile device, and to a computer program. More particularly, the present application relates to a network system in which each of a plurality of mobile devices operates in an autonomously distributed manner without using position information in a work space in order to form an ad hoc network topology, the obtained sensor data being shared, to a mobile device, to a method of controlling the mobile device, and to a computer program.

Still more particularly, the present application relates to a network system in which sensor data for a target found by an individual mobile device within a work space is shared among a plurality of mobile devices, to a mobile device, to a method of controlling the mobile device, and to a computer program. More particularly, the present application relates to a network system in which each of a plurality of mobile devices searches a work space, the mobile devices that have detected the same target perform tracking of the target, and sensor data for the target is shared among the mobile devices, to a mobile device, to a method of controlling the mobile device, and to a computer program.

Along with the rapid development of MEMS (Micro-Electromechanical Systems) technology in recent years, computers that are small, inexpensive, and have high performance comparable to that of supercomputers have been realized. It is expected that the widespread use of these types of computer systems will enrich the daily life of users.

As computer networks have become popular, information resource operations, such as sharing, distribution, and delivery of information, has been actively performed. As a result of the development of the Internet and broadband networks, convenience of information communication has markedly improved. Furthermore, as mobile units that can be connected to the Internet, such as PDAs and mobile phones, have become popular, a ubiquitous network or ubiquitous computing, which can be used anywhere and to which access from a global space is permitted, has attracted attention.

The configuration of computer systems has diversified. Examples of computer systems include typical computer systems including a display and a keyboard/mouse like a personal computer (PC), advanced computer systems having a user interface using speech recognition and image recognition, and robots that operate autonomously.

Unlike fixed computers, it is possible for a robot, in particular, to assist our activities by freely moving in a work space. Examples thereof include proxy handling of dangerous work and difficult work, such as maintenance work in a nuclear power plant, a thermal power plant, and a petrochemical plant, delivery and assembly work in a manufacturing factory, cleaning in a high-rise building, rescuing of people in a fire site and others.

Various kinds of sensors, including a camera, can be installed in a robot. Therefore, it is possible for a robot to obtain information (context) of the physical real world on the basis of sensor data while autonomously moving in a work space.

For example, by using a mobile robot having a sensor function and a wireless communication function as a sensor node and by arranging numerous sensor nodes in such a manner as to be distributed in a comparatively wide area, obtainment and distribution of information in the real world, such as obtainment of constantly changing environment information and simultaneous understanding of information over a wide area, can be performed. As a result of a plurality of mobile robots, each serving as a sensor node, autonomously moving in a coordinated manner and forming a network topology, an ad hoc or self-organized network, that is, a "mobile sensor network", can be constructed.

The inventors of the present invention consider that, according to a mobile sensor network, new services that are not obtainable from a simple network in which sensor devices are connected or that are not obtainable from a single robot having a sensor function are made available.

However, at present, most sensor networks are of a type in which sensor nodes are required to be installed by a human being. In order to increase the efficiency of the topology, sensor nodes need to be installed while understanding the topology of the whole fields, and this is difficult. Several patent applications (for example, refer to Japanese Unexamined Patent Application Publication Nos. 2004-260526 and 2003-44974) have been filed regarding a sensor network system in which a topology is constructed statically and regarding a data collection system.

A method in which each sensor node includes moving means and a network topology is constructed dynamically has not yet attracted much attention in the field of network design. in the field of robotics, several research reports have been published in the past, but proposals in which specific applications are assumed are rare.

One application of a mobile robot having a sensor function includes searching for and tracking of a target. For example, a robot serving as a sensor node can be introduced in a disaster-stricken area so that victims can be found so as to be useful in rescue work. Alternatively, a mobile robot serving as a sensor node can be placed in unmanned premises at night so that searching for and tracking of a suspicious intruder can be performed.

For example, a method of capturing a still or moving target has been proposed (for example, refer to Japanese Unexamined Patent Application Publication No. 7-134031). However, in this method, since a target is captured and a map is created using position information obtained in advance, the method cannot be applied to a work environment where infrastructure has not yet been completed. The method is assumed to capture a target by a single robot as a target capturing device and is not related to a mobile sensor network in which a plurality of devices autonomously move in a coordinated manner, forming a network topology. Furthermore, it is considered that it is difficult to obtain information on a target on the basis of sensor data obtained from a single device.

Furthermore, a mobile robot that can autonomously return to a location where radio waves can reach after it has moved to a location where radio waves cannot reach and thereby continue operation has been proposed (for example, refer to Japanese Unexamined Patent Application Publication No.

2005-25516). However, this mobile robot is assumed to know, for example, the layout and the coordinate information of a building, and conditions in which radio waves can reach, of a radio-wave intensity map, and furthermore the robot is assumed to know its own position. In other words, this mobile robot cannot be applied to a work environment where infrastructure does not exist.

It is desirable to provide a network system, in which each of a plurality of mobile devices operates in an autonomous manner without using position information in a work space in order to form an ad hoc or self-organized network topology and the obtained sensor data is suitably shared, a mobile device, a method of controlling the mobile device, and a computer program.

It is desirable to provide a network system, in which sensor data for a target found by an individual mobile device in a work space can be shared, a mobile device, a method of controlling the mobile device, and a computer program.

It is desirable to provide a network system, in which each of a plurality of mobile devices searches a work space, and the mobile devices that have found the same target perform tracking of the target and can obtain sufficient information about the target, a mobile device, a method of controlling the mobile device, and a computer program.

SUMMARY

According to an embodiment, there is provided a network system including: a plurality of mobile devices each having a sensor function and a wireless communication function, the mobile devices communicating sensor information about a target with one another and tracking the target; target searching means for obtaining sensor information while the plurality of the mobile devices move and for communicating the sensor information among the mobile devices by wireless communication; target focusing means for, in response to one of the mobile devices detecting a target, focusing a sensor on the target in cooperation with mobile devices adjacent to the mobile device detecting the target; and target surrounding means for surrounding the target by using a plurality of mobile devices that focus their sensors on the same target.

The "system" referred to herein refers to a logical assembly of a plurality of devices (or function modules that realize specific functions), and it does not matter particularly whether or not each device and function module is within a single housing (the same applies hereinafter).

For the network system according to an embodiment, a mobile sensor network is constructed in which data individually obtained by a plurality of sensor nodes is shared on a network in which mobile devices (i.e., robots) having a sensor function and a wireless communication function are used as sensor nodes and that is formed in an ad hoc or self-organized manner as a result of the plurality of sensor nodes autonomously operating within a work space.

A mobile sensor network system according to an embodiment is a dynamic surrounding system (DSS) for targets, which is capable of realizing searching for, focusing on, and surrounding of a target by using a plurality of moving sensor nodes. For the DSS to which an embodiment of the present invention is applied, the initial set position of each sensor node and the position information of each sensor node are not assumed, and the mobile sensor network can be constructed dynamically and suitably in a work environment where infrastructure is not completed.

Each mobile device as a sensor node moves on the basis of a predetermined index in an initial search mode. The following are examples of conceivable indexes.

(1) Movement using a layout of a building
(2) Movement using a density with neighboring nodes
(3) Movement using a past history of a sensor (captured image)
(4) Movement using a past movement pattern Of course, the movement does not need to be based on these indexes and may be a simple random walk. In the following description, the movement, including the above movements, is sometimes referred to as a "random walk". Each mobile device includes a camera as a sensor function and communicates video information of the camera in each mobile device to one another. At this time, the camera of each mobile device is operated so that the similarity of the video information of the camera in each mobile device becomes a minimum, making it possible to maximize the sensing area as the whole system.

In the network system according to an embodiment, the main sensor information of each mobile device is video information from the camera. Of course, one or more sensor functions other than the camera may be included, and an attempt to detect the target may be made by using a combination of the video information of the camera and outputs of these sensors may be made. For example, in addition to the camera, the following may be installed into the mobile device: an optical sensor corresponding to the sense of sight, a sound pressure sensor corresponding to the sense of hearing, a smell sensor (chemical substance sensor) corresponding to the sense of smell, a taste sensor, a semiconductor laser sensor or a pyroelectric sensor corresponding to the sense of touch, and the like.

On the other hand, the target focusing means attempts to detect the same target as that of the neighboring node by maximizing the similarity of the camera video in each of neighboring mobile devices in contrast to the process for maximizing the sensing area in the search for a target.

In the target focusing means, the number of mobile devices that focus their sensors on one target may be limited. This is for the purpose of avoiding a situation in which, when a plurality of targets exist within a work space, focus is biased to only a specific target, and it is difficult to obtain the information of the rest targets. More specifically, in the detection packet for reporting the detection of the target, the maximum value of the number of sensor nodes that focus on the target is described. Then, the sensor node receiving detection packets whose number exceeds the maximum value ignores the detection packet for the target.

The network system may further include distance estimation means for estimating a relative distance between mobile devices. In such a case, the target surrounding means may determine whether or not the target can be surrounded on the basis of the information on the relative distance between mobile devices that have focused their sensors on the same target, the relative distance being estimated by the distance estimation means, and each mobile device may be moved on the basis of the determination result.

When each mobile device transmits a wireless signal that is attenuated in proportion to a distance, the distance estimation means may estimate a relative distance between mobile devices on the basis of radio-wave intensity information of a signal received by each mobile device.

The target surrounding means may determine whether or not the target can be surrounded on the basis of whether or not the information of the relative distance between mobile devices matches a desired regular polygon model. That is, when a target is to be surrounded, first, the number of mobile devices that surround the target is known, and an ideal radio-wave intensity obtained when a regular polygon is formed using these mobile devices, that is, the relative distance relationship, is derived as a regular polygon model. Then, the neighboring mobile devices transmit a radio-wave signal to one another, and it can be determined whether or not the target can be surrounded on the basis of whether or not the relative distance relationship between the mobile devices, which is actually obtained, matches this regular polygon model. Such a surrounding determination process is a simple and easy method that does not use position information.

The regular polygon model becomes a different model between when the number of sensor nodes that surround the target is an even number and when it is an odd number. The regular polygon model uses the following two points: when it is assumed that a plurality of sensor nodes form a regular polygon, a pair of nodes apart by an equal number of sides is at approximately the same distance, that is, at approximately the same radio-wave intensity; and, as the number of sides increases, the radio-wave intensity relatively decreases.

The network system according to an embodiment may further include target setting means for statically or dynamically setting a target to be searched for into the target searching means. When the target is dynamically set, the target setting means may broadcast the target by using a wireless communication function of each mobile device in accordance with flooding using multi-hop or in accordance with another data distribution protocol. The target setting means may set, as a target, a moving object detected by the sensor function of a particular mobile device.

According to another embodiment, there is provided a computer program written in a computer-readable format so that operation control for a mobile device that includes a sensor function, a wireless communication function, and moving means and that operates as a communication node on a wireless network to track a target by communicating sensor information about the target with one another is performed on a computer system, the computer program enabling the computer system to execute processing including the steps of: obtaining sensor information while moving using the moving means and communicating the sensor information with neighboring communication nodes; reporting the fact that the target has been detected on the basis of the obtained sensor information to neighboring communication nodes or attempting to detect the same target in response to the reception of a report that the target has been detected from the neighboring communication node; and tracking the target while focusing a sensor on the target detected on the basis of the obtained sensor information.

The computer program according to the embodiment is such that a computer program written in a computer-readable format so as to realize a predetermined process on a computer system is defined. In other words, by installing the computer program according to the embodiment into the computer system, coordinated effects are exhibited on the computer system, and the operation of the mobile device having a sensor function and a wireless communication function can be controlled as a communication node on the network system according to the embodiment. As a result of starting up a plurality of such mobile devices and constructing a mobile sensor network, the same operational effects as those of the network system according to the embodiment of the present invention can be obtained.

Further objects, features and advantages will become apparent from the following description of the preferred embodiments with reference to the attached drawings.

BRIEF DESCRIPTION OF THE FIGURES

FIG. 1 shows a state in which a plurality of sensor nodes having a camera and moving means surround a suspicious person as a target;

FIG. 5 shows a state in which each of neighboring mobile devices moves by a tracking walk while focusing on a suspicious person as a target;

DETAILED DESCRIPTION

Embodiments of the present invention will be described below in detail with reference to the drawings.

The present application is concerned with a mobile sensor network system in which data individually obtained by a plurality of sensor nodes is shared on a network in which mobile devices (i.e., robots) having a sensor function and a wireless communication function are used as sensor nodes and that is formed in an ad hoc or self-organized manner as a result of the plurality of sensor nodes autonomously operating within a work space.

The great feature of the mobile sensor network system according to an embodiment is a dynamic surrounding system (DSS) for targets, which is capable of realizing searching for, focusing on, and surrounding of a target by using a plurality of moving sensor nodes. For the DSS to which an embodiment is applied, the initial set position of each sensor node and the position information of each sensor node are not assumed, and the mobile sensor network can be constructed dynamically and suitably in a work environment where infrastructure is not completed. FIG. 1 shows a state in which a plurality of sensor nodes having a camera and moving means surrounds a suspicious person as a target. Of course, in the dynamic surrounding system according to the embodiment of the present invention, position information obtained from a GPS (Global Positioning System) may also be used.

Figure 2:
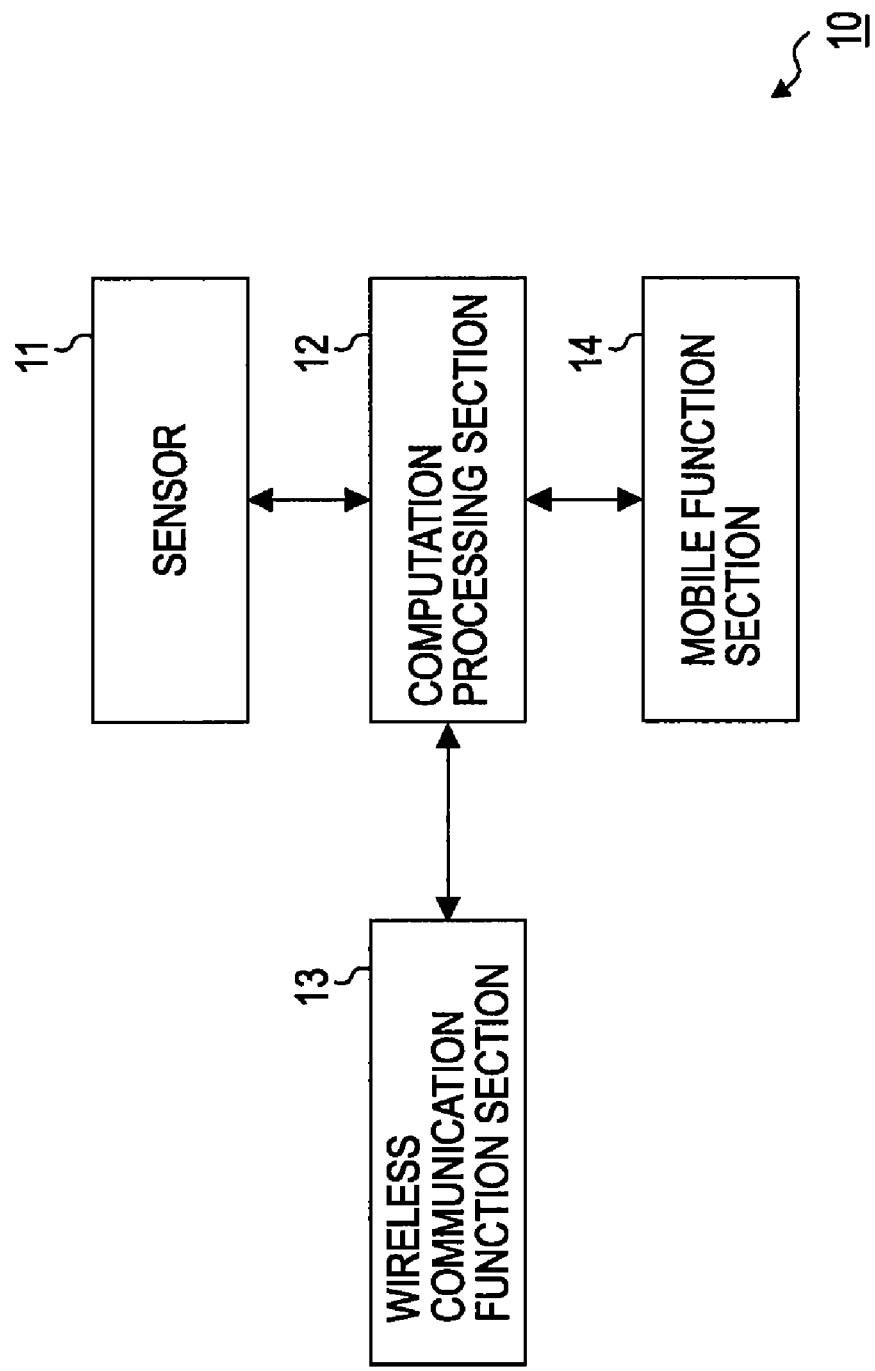
FIG. 2 is a schematic view showing the configuration of a device that can operates as a sensor node on a mobile sensor network according to an embodiment of the present invention.

FIG. 2 is a schematic view showing the configuration of a device that can operate as a sensor node on a sensor network according to an embodiment. A sensor node 10 shown in FIG. 2 includes a sensor 11, a wireless communication function section 13, and a movement function section 14.

The sensor 11 includes a device for detecting a target to be tracked and recognition function means, such as a camera, image processing means for processing a camera input image and recognizing a face image, a microphone, and audio processing means for processing input audio and performing speech recognition. Furthermore, the sensor 11 can include a temperature sensor and a measurement device for gathering various kinds of environment information.

In the description that will be provided later, a search for a target is performed on the basis of image information obtained mainly from a camera. However, when there is a problem with the search accuracy of a target with only the image information, each sensor node may be provided with one or more sensor functions other than a camera and may attempt to detect a target by using the combination of the video information of the camera and outputs of these sensors. More specifically, in addition to the camera, the following may be installed in at least some of sensor nodes: an optical sensor corresponding to the sense of sight, a sound pressure sensor corresponding to the sense of hearing, a smell sensor (chemical substance sensor) corresponding to the sense of smell, a taste sensor, a semiconductor laser sensor or a pyroelectric sensor corresponding to the sense of touch, and the like. For example, when several sensors such as a bodily sensor are provided, the bodily sensor can be used to distinguish between a person and an object. Alternatively, when a temperature sensor is provided, when a forest fire on a mountain is to be searched for, the accuracy with which the target is detected can be increased by causing conditions, such as "temperature higher than or equal to 70 degrees", to be accompanied to abstract information of an "image of a red fire".

The greatest feature of the mobile sensor network system according to the embodiment of the present invention is that, as a result of sharing sensor information obtained by each sensor node via a network, a dynamic surrounding of a target is realized by performing the processing procedure of searching for, focusing on, and surrounding of the target based on the coordinated operation of each node. When a sensing process based on a vision sensor such as a camera is to be performed, control is possible with simple and easy processing without being concerned with two dimensions or three dimensions.

For example, when sensor control such that the sensing area of each sensor node does not overlap is to be performed on the basis of the position information used by many methods of the related art, complex parameters and calculation processing for, such as the direction angle of the sensor, the current position of the sensor node, and presence or absence of an obstruct, become necessary. Furthermore, it is very difficult to hold in advance presence of an obstruct in an unknown environment in the form of numerical parameters, and the system based on the position information lacks flexibility.

A computation processing section 12 is formed of a processor and a memory. The processor executes predetermined program code, thereby centrally controlling the overall operation of the mobile device 10. For example, the computation processing section 12 controls the device operation as a sensor node in a dynamic surrounding system, such as a target setting process, a target search process, a target focusing process, and a target surrounding process. The detailed procedure of each process will be described later.

The wireless communication function section 13 performs wireless communication with other sensor nodes in accordance with IEEE 802.11, Bluetooth communication, or any another desired communication protocol. In this embodiment, the wireless communication function section 13 constructs a network by autonomously distributed operations (that is, in an ad hoc mode). In the dynamic surrounding system according to this embodiment, it is assumed that moving sensor nodes can exchange information directly or by multi-hop. For the multi-hop, a routing protocol for an ad hoc network can be used.

It is assumed that the wireless signal sent out by the wireless communication function section 13 is a signal that is attenuated in proportion to a distance. The reason for this is that a relative position relationship with neighboring sensor nodes is estimated on the basis of a received radio-wave intensity. For example, when the surrounding of a target is to be realized, the value of an attenuation signal with neighboring nodes is used without using the position information. As a result of surrounding a target by a plurality of nodes and as a result of detecting the target by using each of the sensors from various angles, it is possible to obtain more abundant information on the same target. However, details of the target surrounding process will be described later.

Many wireless communication devices transmit and receive radio-wave intensity information in a physical layer.

Therefore, it is adequate to assume the presence of information of an attenuation signal. Alternatively, a communication device capable of measuring a distance between two actual nodes may be used as for ultra-wide band (UWB) communication without using the attenuation of a signal in proportion to a distance.

The movement function section 14 is formed of a mechanical movement mechanism, such as for a wheel-type movement or a walk-type movement using movable legs, and performs a movement operation in accordance with the computation processing section 12. In the dynamic surrounding system according to this embodiment, it is assumed that a small number of sensor nodes move, and sensing of a wider area is performed. Therefore, basically, a target search method employing a random walk is adopted. Furthermore, in some cases, the sensor nodes move by using past sensed data. The functions, such as for collision avoidance and posture stability control during a movement operation, may be provided. However, since the functions are not directly related to the gist of the present invention, the descriptions thereof are omitted herein.

Furthermore, the mobile device 10 may include, in addition to those shown in FIG. 2, a user interface for accepting user input, including a target setting process, and other function sections.

The mobile sensor network system according to the embodiment of the present invention is a dynamic surrounding system (DSS) in which a plurality of sensor nodes that move are used to surround a constantly moving target, and sensor information about one target is dynamically obtained from various angles. The main processing of this DSS is broadly classified into a target setting process, a target search process, a target focusing process, and a target surrounding process. Each of these processes will be described below.

Target Setting Process

The target referred to herein is an object for which the mobile device serving as a sensor node searches. In order to allow the sensor node to search for a target, it is necessary to set in advance sensor information. There are two cases for a search: one case in which a search target is known beforehand as in a search for a missing child, and the other case in which a target is not known as in a search for a suspicious person. Furthermore, when a target is known beforehand, the target setting process can be classified into a static setting method and a dynamic setting method.

For example, when sensor nodes are to be installed on the assumption that a specific target is searched for, the target is statically set. More specifically, information of the target image is stored in advance in the sensor nodes. Since a similarity is used for the search (to be described later), it is possible to specify in advance several target detection conditions in a from in which only the distinctive characteristics of the target, such as, for example, "a red and round target", are described.

When a target is to be dynamically set, a target image observed by an observer is broadcast to each sensor node in the mobile sensor network by using a data distribution protocol such as flooding using multi-hop. In order to avoid a situation in which a different target is observed from each of a plurality of sensor nodes, and various kinds of target information are exchanged, new information may be given priority by sequence number management. Since the target information is shared among neighboring nodes when the target is found, the drawbacks that flooding does not arrives at all the nodes within the network can be compensated.

A dynamic setting method for setting a target as necessary when a moving object is detected by a camera in each sensor node may also be used. This setting method can be used in a situation in which a target is not known beforehand and a suspicious person is monitored at a specific place. In the image processing for this case, the mechanism of motion detection is used.

The following should be taken note of: the dynamic surrounding system to which an embodiment of the present invention is applied detects a target to be searched for and is therefore not limited to a specific technology, such as camera image processing. The image processing used by the dynamic surrounding system (to be described below) is not deviated in comparison with the technology level in the art at present and is adequate as the assumed technology. The important thing in the dynamic surrounding system according to the embodiment of the present invention is not the accuracy (the accuracy of a sensor) of image processing in individual sensor nodes, but the functions that are realized when the network is formed by a plurality of sensor nodes and the system design thereof.

Target Search Process

When the target is determined by the target setting process in the sensor node, a process for searching for the target is performed.

The sensor node during the initial set time enters a "search mode" and searches for a target while moving on the basis of a predetermined index. Examples of conceivable indexes herein are the following.

(1) Movement using a layout of a building
(2) Movement using a density with neighboring nodes
(3) Movement using a past history of a sensor (captured image)
(4) Movement using a past movement pattern Of course, the movement does not need to be based on these indexes and may be a simple random walk. In the following description, the movement, including the above movements, is sometimes referred to as a "random walk". When a plurality of distributed sensor nodes perform an effective search, it is important that no matter they move based on any index, a different area is sensed for each sensor node, that is, the sensing area for the system is maximized.

Figure 3:
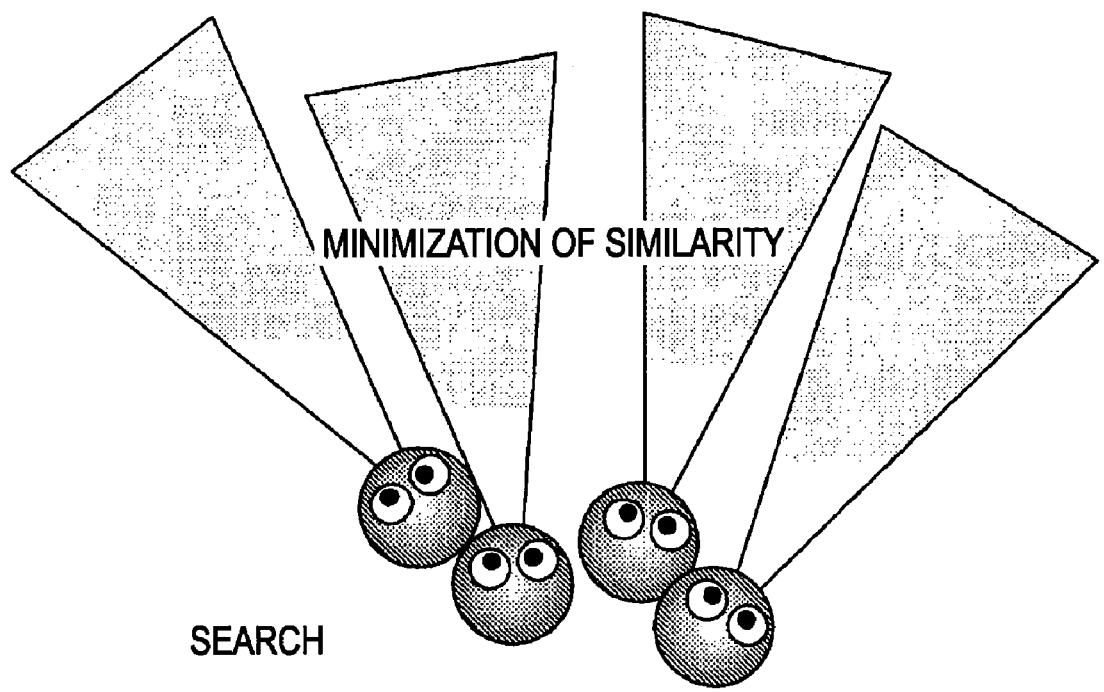
FIG. 3 shows a state in which a sensing area is maximized by minimizing the similarity of camera video in each of neighboring sensor nodes.

For the maximization of the sensing area, in the dynamic surrounding system according to this embodiment, camera control based on the similarity of images is performed. Each sensor node transmits in broadcast video information periodically to neighboring nodes. As a result of exchanging video information in the manner described above, it is possible for each sensor node to know in real time a video that is currently being projected by a neighboring node (i.e., information being sensed). Furthermore, each sensor node operates (the direction of the line of sight of) its own camera so that the similarity between the video sent from a neighboring node and the video projected by itself is minimized. In this manner, the maximization of the sensing area can be realized between neighboring nodes, that is, for the system. FIG. 3 shows a state in which a sensing area is maximized by minimizing the similarity of the camera video in each of the neighboring sensor nodes.

Furthermore, each sensor node stores, as a history, not only sensor information in real time, but also video received from neighboring nodes and video obtained from the camera of its own. By minimizing the similarity with this history information, function expansion, such as efficient sensing of a new area being performed in a search process, is also possible.

Target Focusing Process

When a particular sensor node detects a target, as a result of reporting this fact to neighboring nodes, a target focusing process for focusing cameras of a plurality of sensor nodes on a specific target is performed.

The sensor node that has detected the target shifts from the detection mode to the search mode, and transmits in broadcast a detection packet containing a video of the target to neighboring sensor nodes. In this detection packet, a random number that is selected from a sufficiently large area in which uniqueness can be guaranteed with a high probability is set as an identifier. That is, the sensor node that has detected the target first sets a unique random number identifier to the target. This identifier is used to control a maximum number of sensor nodes that focus on a specific target.

Figure 4:
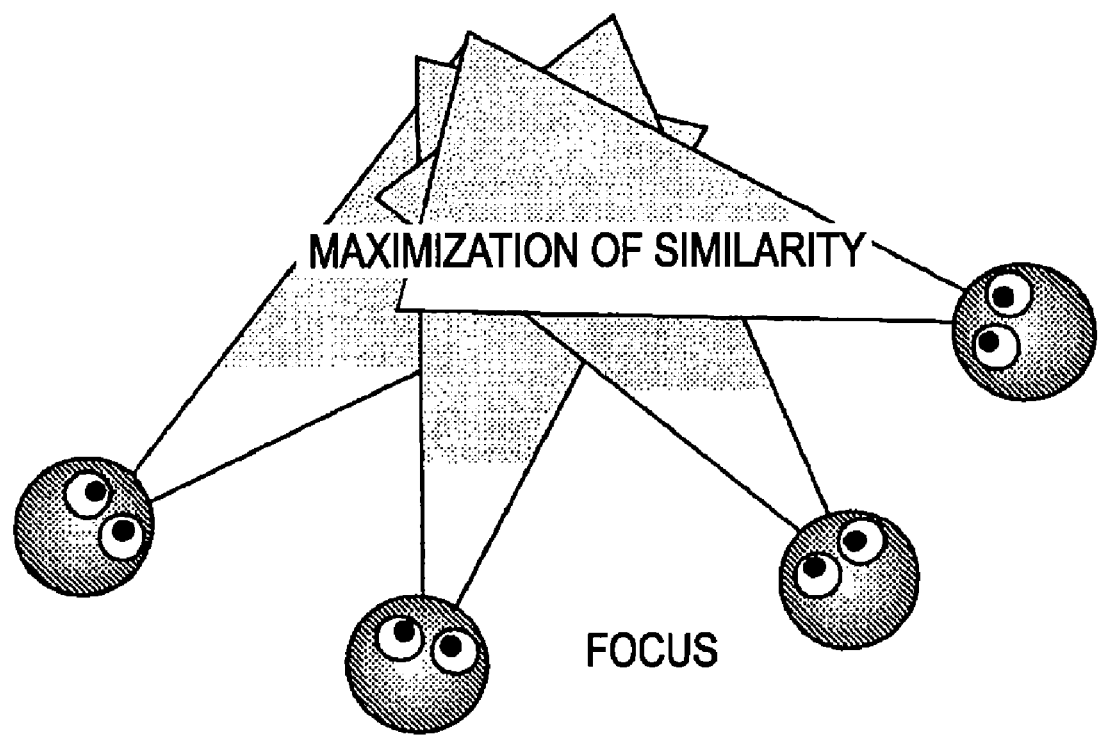
FIG. 4 shows a state in which an attempt to detect the same target is made by maximizing the similarity of camera video in each of neighboring sensor nodes.

The neighboring sensor node receiving the detection packet operates the camera of its own so that the similarity with the video contained in that packet is maximized. This is a process reverse to the process (described above) for maximizing the sensing area in the search for a target. FIG. 4 shows a state in which attempts to detect the same target are made by maximizing the similarity of camera video in each of neighboring sensor nodes. When the target is detected, the sensor node enters a detection mode and reports in broadcast the detection packet to neighboring sensor nodes.

In the detection packet, the maximum value of the number of the sensor nodes that focus on that target is described. The sensor node receiving detection packets whose number is greater than the maximum value ignores the detection packet for the target. This is for the purpose of avoiding a situation in which, when a plurality of targets exist, focus is biased to only a specific target and the information of the rest targets are not obtained.

When the sensor node that has shifted to the detection mode as a result of the reception of the detected packet can detect the corresponding target, the sensor node shifts to the tracking mode and changes the movement operation by the movement function section 14 from a random walk to a tracking walk. In the tracking walk, when the target is moving, tracking is performed while focusing on this target. FIG. 5 shows a state in which each of neighboring sensor nodes moves by a tracking walk while focusing on a suspicious person as a target.

Target Surrounding Process

Among a plurality of sensor nodes that have detected the same target and that are tracking this target while focusing thereon, a target surrounding process for surrounding the target in a self-organized manner is performed.

The greatest feature of the dynamic surrounding system according to this embodiment is that a topology by a plurality of sensor nodes is formed by using only information that is attenuated in proportion to a distance, such as a radio-wave intensity of a wireless signal output from each sensor node, without using position information.

Here, information, such as a radio-wave intensity, is generally susceptible to the influence of disturbances and is unstable. As a consequence, there is a problem in that it is difficult to obtain sufficient accuracy with a mechanism using an absolute value. Therefore, in this embodiment, the stability of the system is increased by using a relative relationship without using an absolute value of a radio-wave intensity. There are three relationships for the relative relationship as referred to herein: for example, the radio-wave intensity with respect to A is greater than, smaller than, or nearly equal to the radio-wave intensity with respect to B, which can be determined by setting two threshold values.

Figure 6:
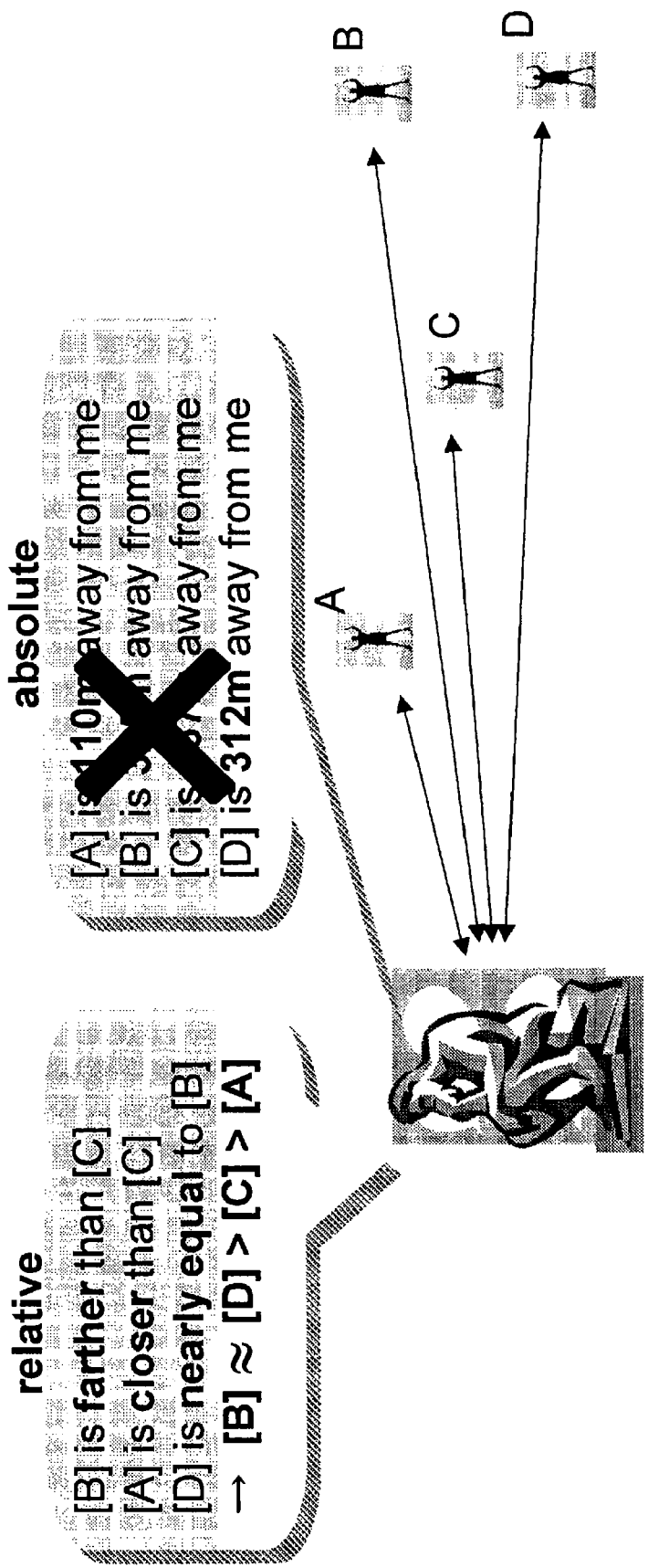
FIG. 6 shows a state in which a particular sensor node makes a determination as to a relative distance relationship with each of sensor nodes A and B.

FIG. 6 shows a state in which a particular sensor node makes a determination as to a relative distance relationship with each of neighboring sensor nodes. In the example shown in FIG. 6, a particular sensor node does not measure an absolute distance to each of the neighboring sensor nodes A to D and instead makes a determination as follows: on the basis of the comparison of the magnitudes of the received signal intensities from each of the sensor nodes A to D, the node B is more away from the node C, the node A is closer than the node C, and the node D is at a distance nearly equal to that of the node B. As a result, the position relationship as shown in the following equation can be derived (the relative distance to a node X is represented as [X]):

$$[B] \approx [D] > [C] > [A]$$

In the dynamic surrounding system according to this embodiment, when a target surrounding process is to be performed, first, the number of sensor nodes for surrounding the target is known, and an ideal relative relationship of radio-wave intensities obtained when a regular polygon in which the target is the center is formed by these sensor nodes is derived. In this specification, this ideal state is referred to as a "regular polygon model". The regular polygon model can be defined by a relative relationship between received radio-wave intensities from each sensor node, which corresponds to the relative distance between sensor nodes. That is, for the regular polygon model, the following two points are used: (1) when it is assumed that a regular polygon is formed by a plurality of sensor nodes, a pair of nodes apart by an equal number of sides is at nearly the same distance, that is, becomes at nearly the same radio-wave intensity, and (2) as the number of sides increases, the radio-wave intensity relatively decreases.

Figure 7:
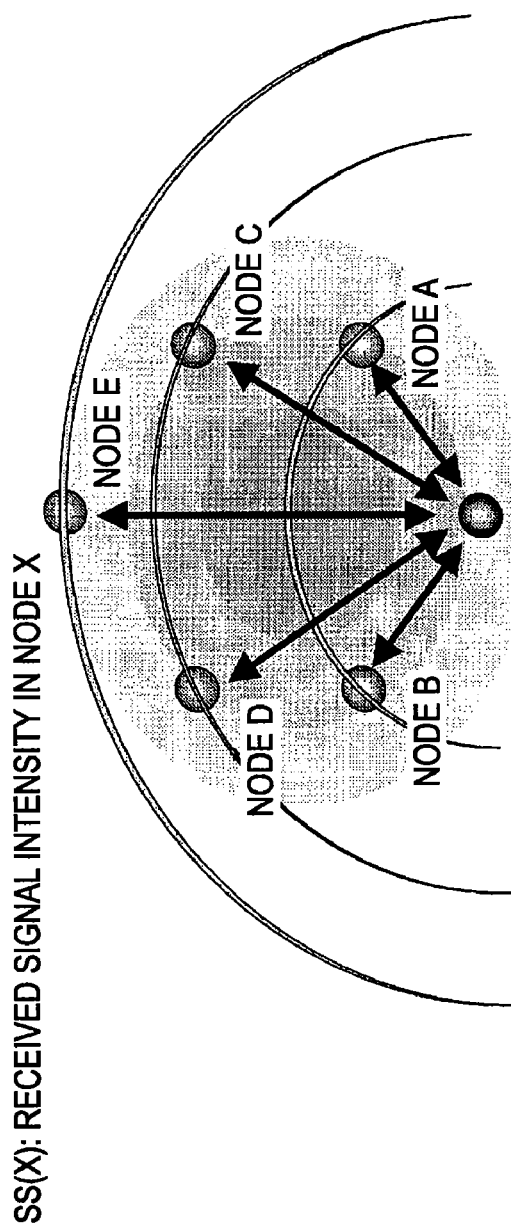
FIG. 7 illustrates a mechanism for defining a regular polygon model between neighboring nodes by a relative relationship between radio-wave intensities between sensor nodes.

FIG. 7 shows a state in which a particular sensor node, in cooperation with five neighboring sensor nodes B to E, form a regular hexagon that surrounds a target. When the received signal intensity from the node X is represented as SS(X), when a network topology close to a regular hexagon can be formed as shown in FIG. 7, the relative relationship described below holds between received signal intensities from each of neighboring sensor nodes. Therefore, it can be determined whether or not a target is surrounded in an ideal state on the basis of the relative relationship between received signal intensities from each sensor node.

$$SS(A) \approx SS(B) > SS(C) \approx SS(D) > SS(E)$$

The regular polygon model becomes a different model between when the number of sensor nodes that surround a target is an even number and when the number is an odd number. The regular polygon model is used differently as described below depending on whether the number N of neighboring sensor nodes is an odd number or an even number.

if N is "odd" number $$SS(\ ) \approx SS(\ ) > SS(\ ) \approx SS(\ ) > \ldots > SS(\ ) \approx SS(\ ) > SS(\ )$$

if N is "even" number $$SS(\ ) \approx SS(\ ) > SS(\ ) \approx SS(\ ) > \ldots > SS(\ ) \approx SS(\ )$$

However, such a regular polygon model is only an ideal form. In practice, there is a possibility that it is difficult to form a regular polygon due to presence or absence of an obstruct that exerts an influence upon radio waves and due to a situation where movement is physically difficult.

Figure 8:
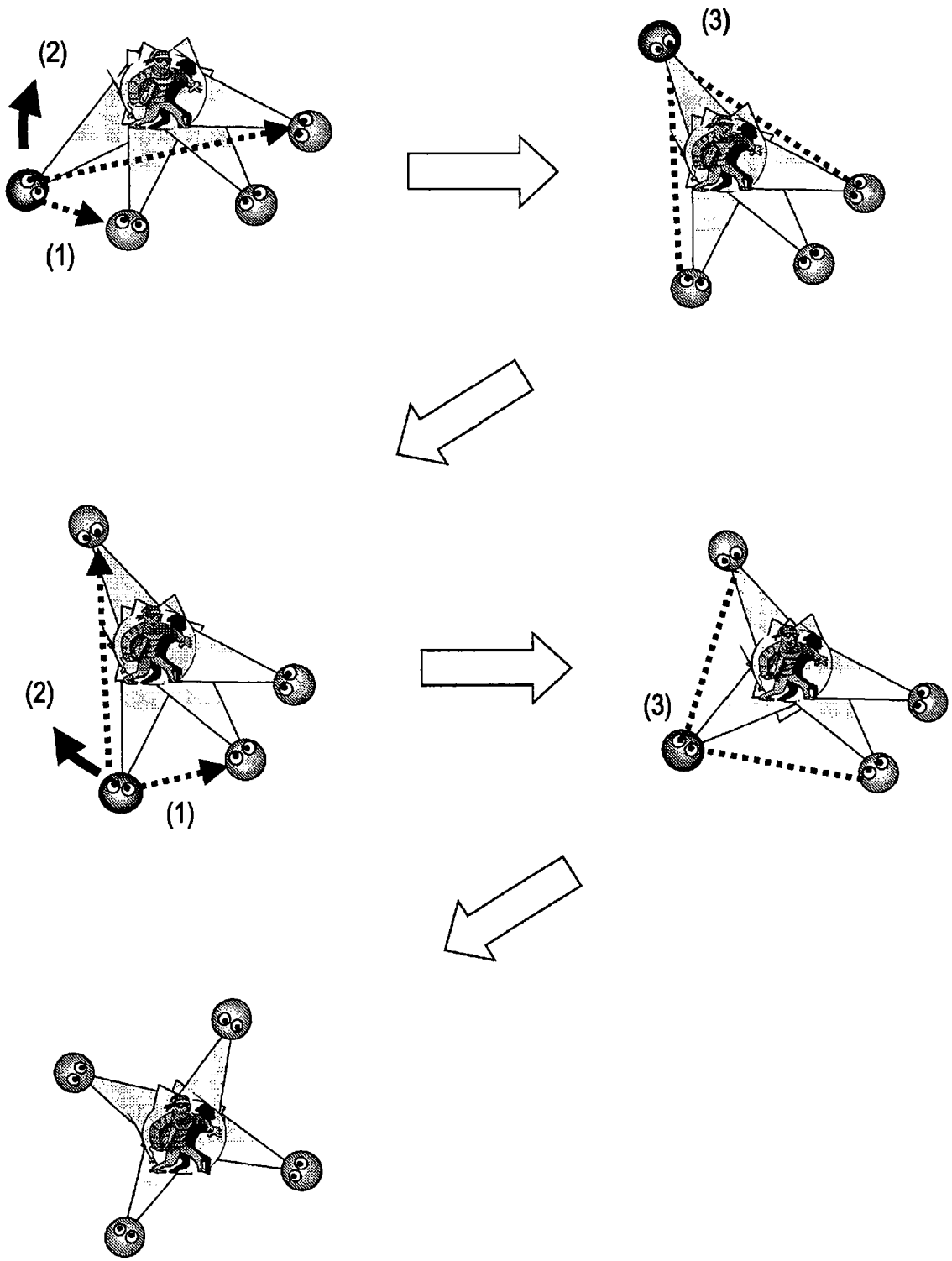
FIG. 8 shows a state in which the arrangement of neighboring nodes surrounding a target is brought closer to a regular polygon model by controlling the movement of a sensor node that is deviated from the regular polygon model.

Several methods for using the target surrounding process using a regular polygon model can be conceived. For example, each sensor node forms, as a list, the radio-wave intensities with respect to all the neighboring nodes and transmits in broadcast the list to the neighboring nodes. Such a procedure enables the sensor nodes that surround the target to known the radio-wave intensities among all the nodes. In this case, since the position relationship among the sensor nodes can be known, it is possible become closer to a regular polygon model by controlling the movement of a sensor node that is deviated from the regular polygon model, as shown in FIG. 8.

For the control of the movement of the sensor node, rather than by a random walk, the sensor node may move with a high accuracy by using, for example, an electronic compass. When many nodes that surround the target exist, another possible usage is a method in which the nodes are not moved and nodes as close to the model as possible are selected from among the nodes as surrounding processing nodes.

Operation of the Mobile Device

Figure 9:
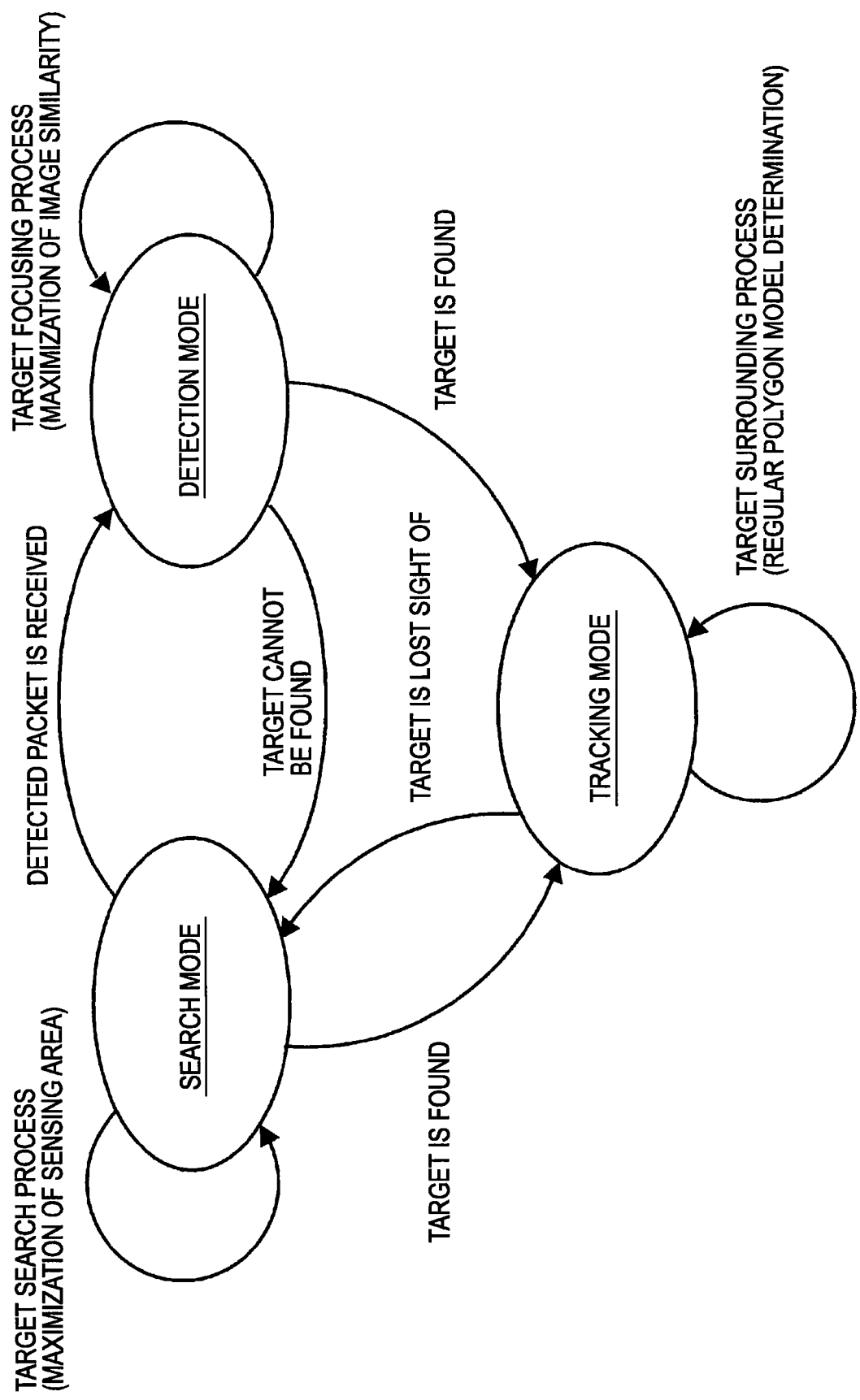
FIG. 9 is a state transition diagram of a mobile device that operates as a sensor node in a mobile sensor network system.

Next, a description will be given of the operation of the mobile device 10 that functions as a sensor node in the dynamic surrounding system. FIG. 9 is a state transition diagram of the mobile device 10 that operates as a sensor node in a mobile sensor network system according to this embodiment. As shown in FIG. 9, when the mobile device 10 operates as a sensor node, the mobile device 10 shifts among the search mode, the detection mode, and the tracking mode depending on an event that occurs.

The sensor node during the initial set time enters a search mode, moves by a random walk, and searches for a target.

The sensor node that has detected the target transmits in broadcast the detection packet containing camera video of the detected target to neighboring sensor nodes.

The sensor node shifts from the search mode to the detection mode in response to the reception of the detection packet from a neighboring sensor node. In this detection mode, the sensor node attempts to detect the target by operating the camera of its own so that the similarity with the video contained in the detection packet is maximized. When the target can be detected, the sensor node further transmits in broadcast the detection packet to neighboring sensor nodes.

The sensor node that has first detected the target in the search mode and the sensor node that has detected the target in the detection mode shift to the tracking mode, does not move by a random walk, focus on the target, and track this target when the target moves.

In the tracking mode, a target surrounding process for surrounding the target among sensor nodes that track the same target is performed.

In the tracking mode, when the target being tracked is lost sight of, the sensor node returns to the search mode and attempts to detect the next target while moving by a random walk.

In the detection mode, when the target reported by the detection packet cannot be detected (for example, when a timeout of a timer that is set in response to the reception of the detection packet occurs), the sensor node returns to the search mode and attempts to detect the next target while continuing a random walk.

Figure 10:
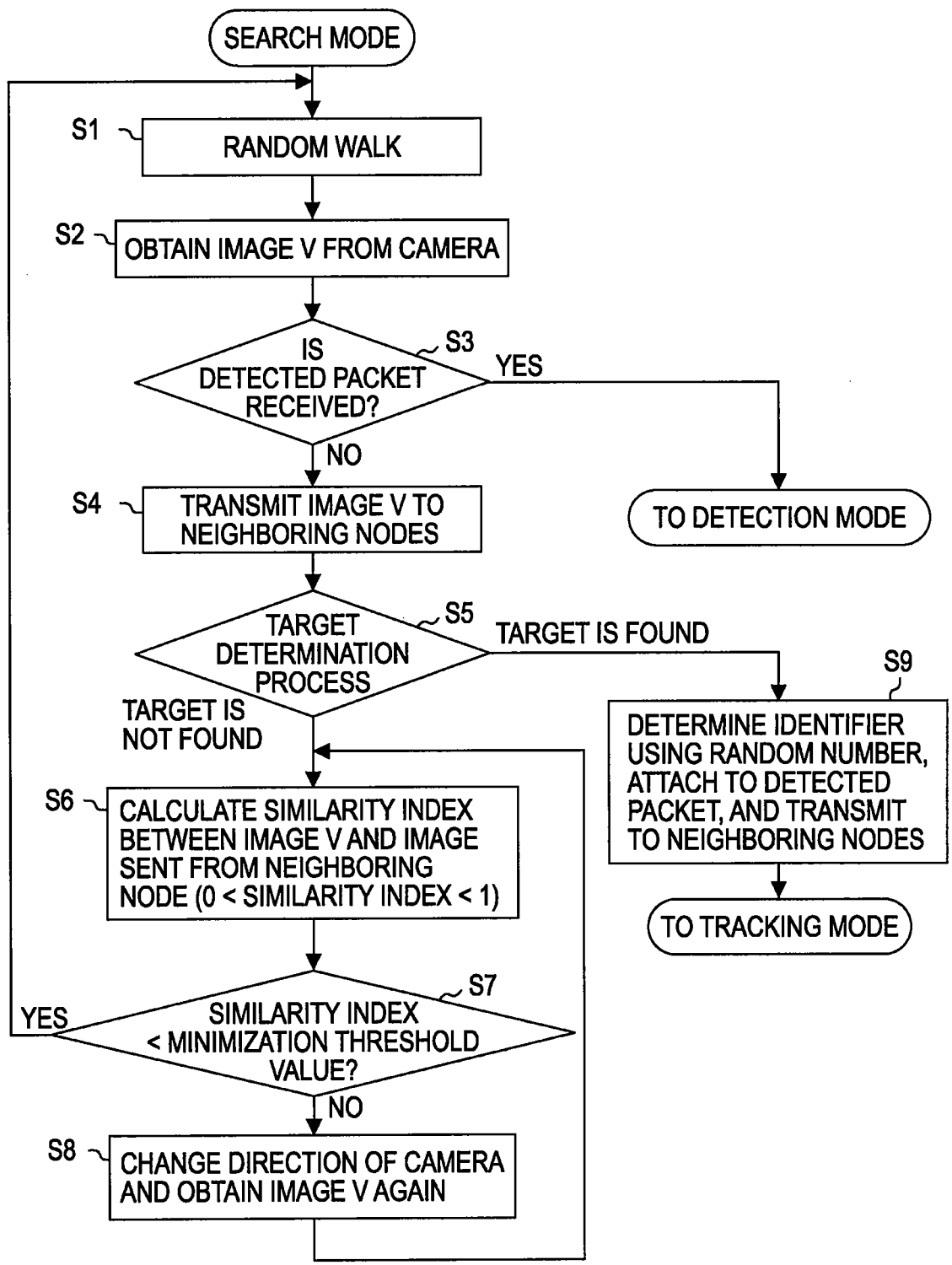
FIG. 10 is a flowchart showing the operation procedure of a sensor node in a search mode.

FIG. 10 is a flowchart showing the operation procedure of a sensor node in a search mode.

A mobile device as a sensor node moves by a random walk in the initial search mode (step S1). Then, the mobile device obtains an image V from the camera provided as a sensor function (step S2).

Here, when a detection packet is received from a neighboring sensor node (step S3), the mobile device returns to the detection mode. The operation procedure of the mobile device in the detection mode will be described later.

When a detection packet is not received from neighboring sensor nodes, the mobile device transmits in broadcast the image V captured by the camera of its own to the neighboring sensor nodes (step S4).

In the detection packet, the maximum value of the number of the sensor nodes that focus on the target is described. When many detection packets whose number is greater than the maximum value is received, the mobile device ignores the detection packet for the target and proceeds to the subsequent step S4 without shifting to the detection mode. This is for the purpose of avoiding a situation in which, when a plurality of targets exist, focus is biased to only a specific target.

Next, a target determination process is performed on the basis of the image V captured by the camera (step S5).

Figure 13:
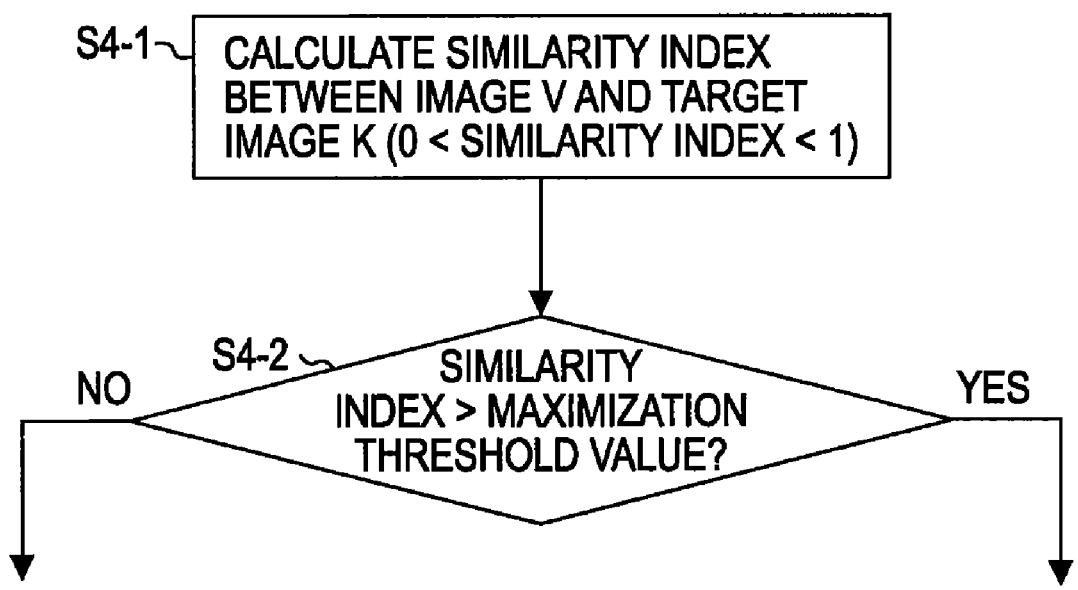
FIG. 13 is a flowchart showing a target determination processing procedure.
Figure 14:
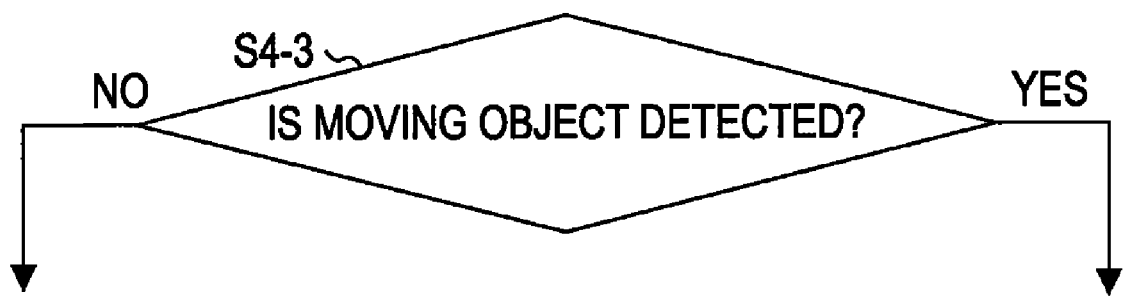
FIG. 14 is a flowchart showing a target determination processing procedure.

In the sensor node, an image K of the target is dynamically or statically set by the above-described target setting process. FIG. 13 shows a target determination processing procedure for this case. That is, the index of the similarity between the image V captured by the camera of its own and the image K of the target, which is set in advance (step S4-1). Then, when the computed similarity index exceeds a predetermined maximization threshold value, it is determined that the target has been detected, and if not, it is determined that the target has not been detected (step S4-2). Alternatively, a dynamic setting method for setting a moving object as a target as necessary when it is detected by the camera may also be used. In this case, as shown in FIG. 14, when a moving object is detected from the image V captured by the camera of its own, this object is set as a target, and if not, it is determined that a moving object has not been detected (step S4-3).

When it is determined as a result of the target determination process that the target has been detected, a random number that is selected from a sufficiently large area in which uniqueness can be guaranteed with a high probability is set as an identifier for the target. The detection packet to which the random number identifier is attached is transmitted to neighboring sensor nodes (step S5). The mobile device shifts to the tracking mode in which it moves while tracking the detected packet using the camera.

On the other hand, when it is determined as a result of the target determination process that the target has not been detected, a process for maximizing the sensing area with neighboring sensor nodes is performed. In this case, the index of the similarity between the image V captured by the camera of its own and the image sent from the neighboring sensor node is calculated (step S6). When the computed similarity index does not fall below the maximization threshold value (step S7), the direction of the camera is changed to obtain the image V again (step S8), and the calculation of the index of the similarity with the image from a neighboring sensor node, and the threshold value determination are repeatedly performed. That is, the sensor node realizes the maximization of the sensing area by operating (the direction of the line of sight of) its own camera so that the similarity between the video sent from a neighboring node and the video projected by itself is minimized, that is, as the system.

Figure 11:
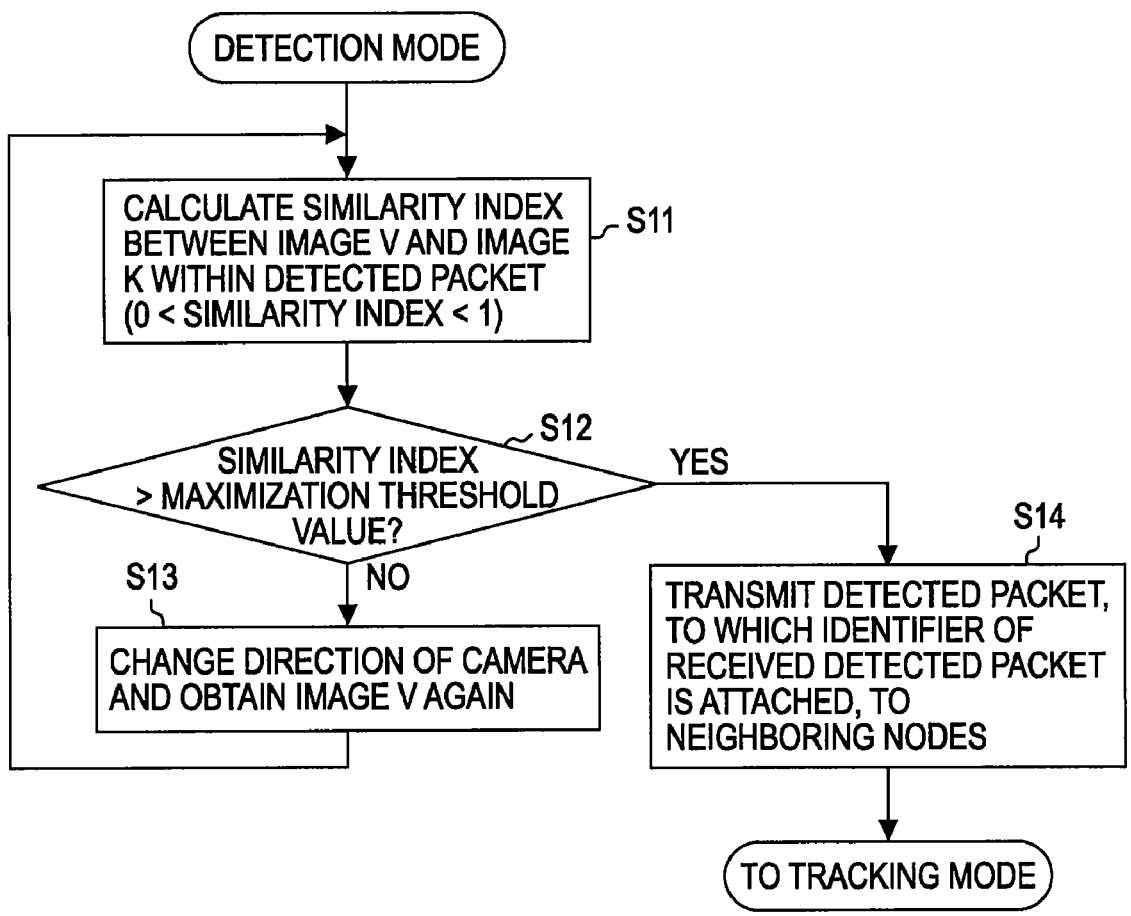
FIG. 11 is a flowchart showing the operation procedure of a sensor node in a detection mode.

FIG. 11 is a flowchart showing the operation procedure of a sensor node in a detection mode.

The neighboring sensor node receiving the detection packet operates its own camera so that the similarity with the video contained in the corresponding packet is maximized. This is a process reverse to the process (described above) for maximizing the sensing area in the search for a target.

The mobile device as a sensor node calculates the index of the similarity between the image V captured by the camera of its own and the image K contained in the detection packet (step S11). Then, by comparing the computed similarity index with a predetermined maximization threshold value, it is determined whether or not the same target as that of the transmission source node of the detection packet can be detected (step S12).

When it is determined that the same target can be detected, a random number identifier that is described in the received detection packet is attached, and the detection packet is transmitted to neighboring sensor nodes (step S13). The mobile device shifts to the tracking mode in which it moves while tracking the detected packet using a camera.

On the other hand, when it is determined that the same target as that reported by the detection packet has not been detected, the direction of the camera is changed to obtain the image V again (step S14), and the calculation of the index of the similarity with the image K in the detection packet, and the threshold value determination are repeatedly performed. That is, the sensor node operates its own camera so that the index of the similarity with the image K contained in the detection packet is maximized.

Figure 12:
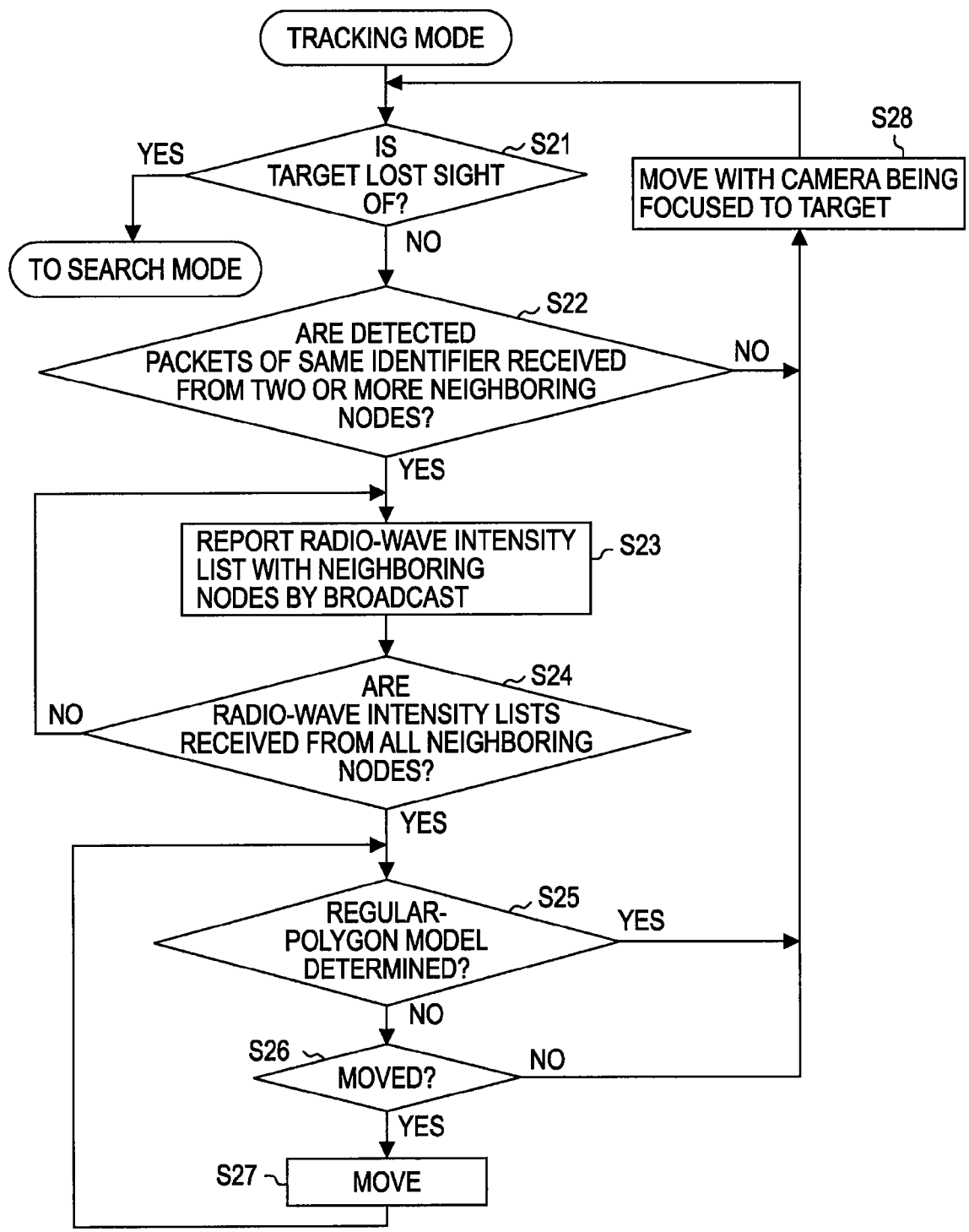
FIG. 12 is a flowchart showing the operation procedure of a sensor node in a tracking mode.

FIG. 12 is a flowchart showing the operation procedure of a sensor node in a tracking mode.

In the tracking mode, the mobile device as a sensor node moves, instead of by a random walk, by a tracking walk for tracking a moving target while focusing thereon.

Here, when the target being tracked is lost sight of (step S21), the mobile device returns to the search mode, shifts to a random walk, and attempts to find a target again (the target may be the same or another target).

When detection packets having the same identifier have been received from two or more neighboring nodes while tracking a target (step S22), a target surrounding process for surrounding the target is performed in cooperation with a plurality of sensor nodes that have detected the same target.

In this embodiment, a topology is formed by a plurality of sensor nodes by using information that is attenuated in proportion to a distance on the basis of the radio-wave intensity of a wireless signal output from each sensor node without using position information. Furthermore, the stability of the system is improved as a result of using a relative relationship without using the absolute value of the radio-wave intensity.

In the target surrounding process, first, a radio-wave intensity list in which radio-wave intensities from each neighboring sensor node are described is transmitted in broadcast (step S23).

Then, when the radio-wave intensity lists are completely received from each neighboring sensor node (step S24), next, a regular-polygon model determination is performed (step S25).

The regular polygon model refers to an ideal relative relationship of radio-wave intensities, which are obtained when a regular polygon in which the target is the center is formed by using sensor nodes that surround the same target. For the regular polygon model, the following two points are used (described above): (1) when it is assumed that a regular polygon is formed by a plurality of sensor nodes, a pair of nodes apart by an equal number of sides is at nearly the same distance, that is, becomes at nearly the same radio-wave intensity, and (2) as the number of sides increases, the radio-wave intensity relatively decreases.

When the result of performing the regular polygon model determination on the basis of the received radio-wave intensity list indicates that an ideal state in which the target is surrounded has not been formed, it is further determined whether or not the sensor node itself should move (step S26). When the sensor node has moved (step S27), the process returns to step S25, where the regular-polygon model determination and the movement determination are repeatedly performed.

When it is determined that an ideal regular polygon model has been formed with neighboring sensor nodes (step S25) and when it is determined that an ideal regular polygon model has not been formed, but the mobile device does not need to move (step S26), it moves by a tracking walk by focusing its camera on the target (step S27).

Figure 15:
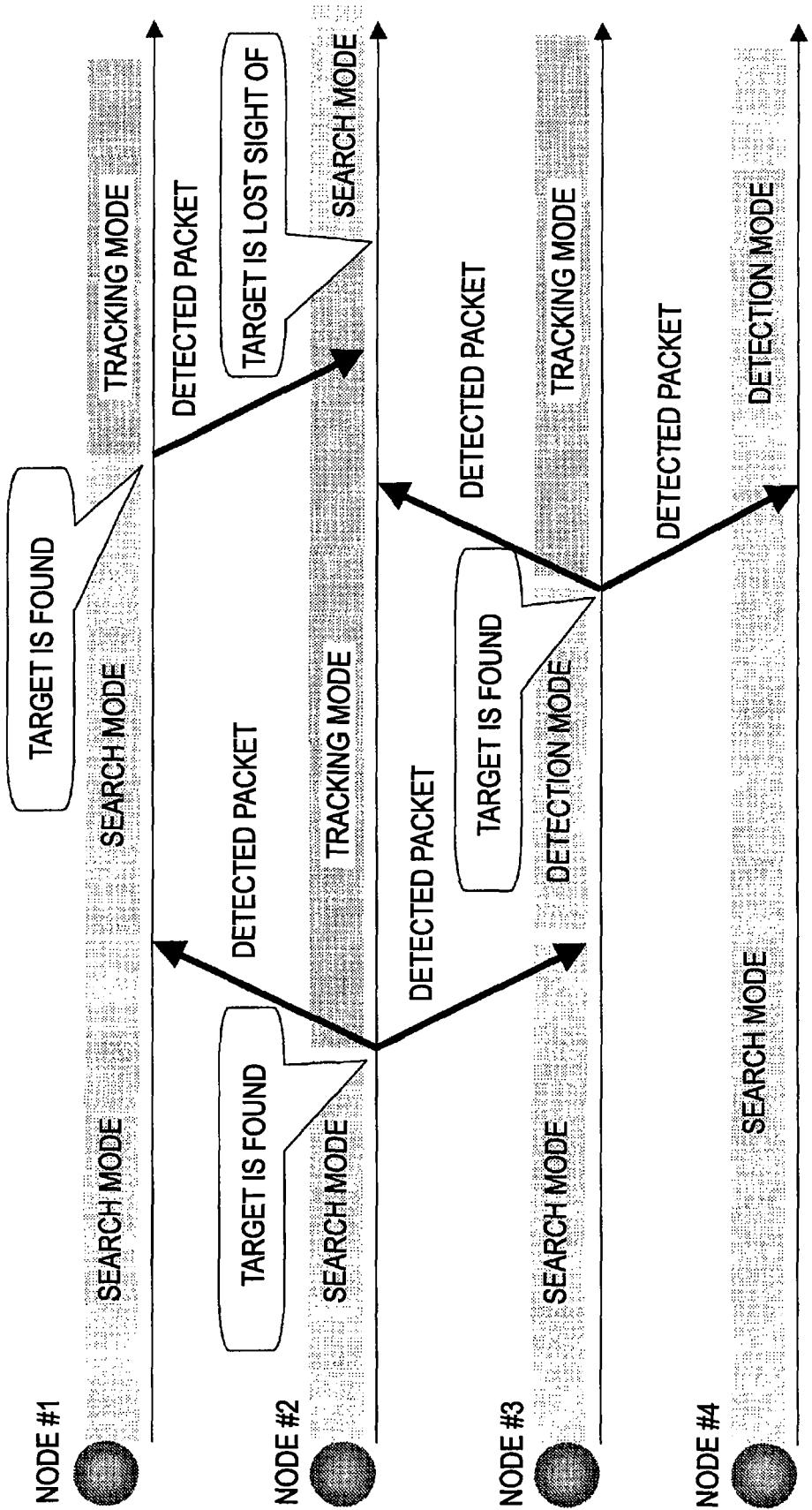
FIG. 15 shows an example of an operation sequence in a dynamic surrounding system according to an embodiment.

FIG. 15 shows an example of an operation sequence in the dynamic surrounding system according to this embodiment. In the example shown in FIG. 15, a mobile sensor network environment formed of four sensor nodes #1 to #4 is assumed. However, it is assumed that the sensor node #1 can communicate with only the sensor node #2, the sensor node #2 can communicate with only the sensor nodes #1 and #3, the sensor node #3 can communicate with only the sensor nodes #2 and #4, and the sensor node #4 can communicate with only the sensor node #3.

Each of the sensor nodes #1 to #4 moves by a random walk in the initial search mode. Each sensor node transmits in broadcast video information periodically to neighboring nodes, and operates (the direction of the line of sight of) its own camera so that the similarity between the video sent from a neighboring node and the video projected by itself is minimized, thereby maximizing the sensing area.

Here, when the sensor node #2 detects the target, the sensor node #2 transmits in broadcast a random number packet and a detection packet containing the image of the target. Also, the sensor node #2 shifts to the tracking mode and moves by a tracking walk while focusing its camera on the target.

The detection packet from the sensor node #2 arrives at the adjacent sensor nodes #1 and #3. Then, the sensor nodes #1 and #3 shift to the detection mode, and attempt to detect the same target while operating their cameras so that the similarity with the video contained in the packet is maximized.

When the sensor node #1 finds the target, the sensor node #1 transmits in broadcast the detection packet containing a random number identifier contained in the received detection packet, and it arrives at the adjacent sensor node #2. Furthermore, the sensor node #1 shifts to the tracking mode and moves by a tracking walk while focusing its camera on the target.

Similarly, when the sensor node #3 finds a target, the sensor node #3 transmits in broadcast the detection packet containing a random number identifier contained in the received detection packet, and this detection packet arrives at the adjacent sensor nodes #2 and #4. Furthermore, the sensor node #3 shifts to the tracking mode and moves by a tracking walk while focusing its camera on the target.

In response to the reception of the detection packet, the sensor node #4 shifts to the detection mode and attempts to detect the same target while operating its own camera so that the similarity with the video contained in the packet is maximized.

Since the sensor node #2 has received detection packets having the same identifier from two or more neighboring nodes, the sensor node #2 starts up a target surrounding process (described above) for surrounding a target.

Thereafter, when the sensor node #2 loses the sight of the target, the sensor node #2 returns the search mode, changes to a random walk, and attempts to find again the target (the target may be the same or another target).

FIGS. 16 to 31 show operation simulation results in the dynamic surrounding system according to this embodiment.

Figure 16:
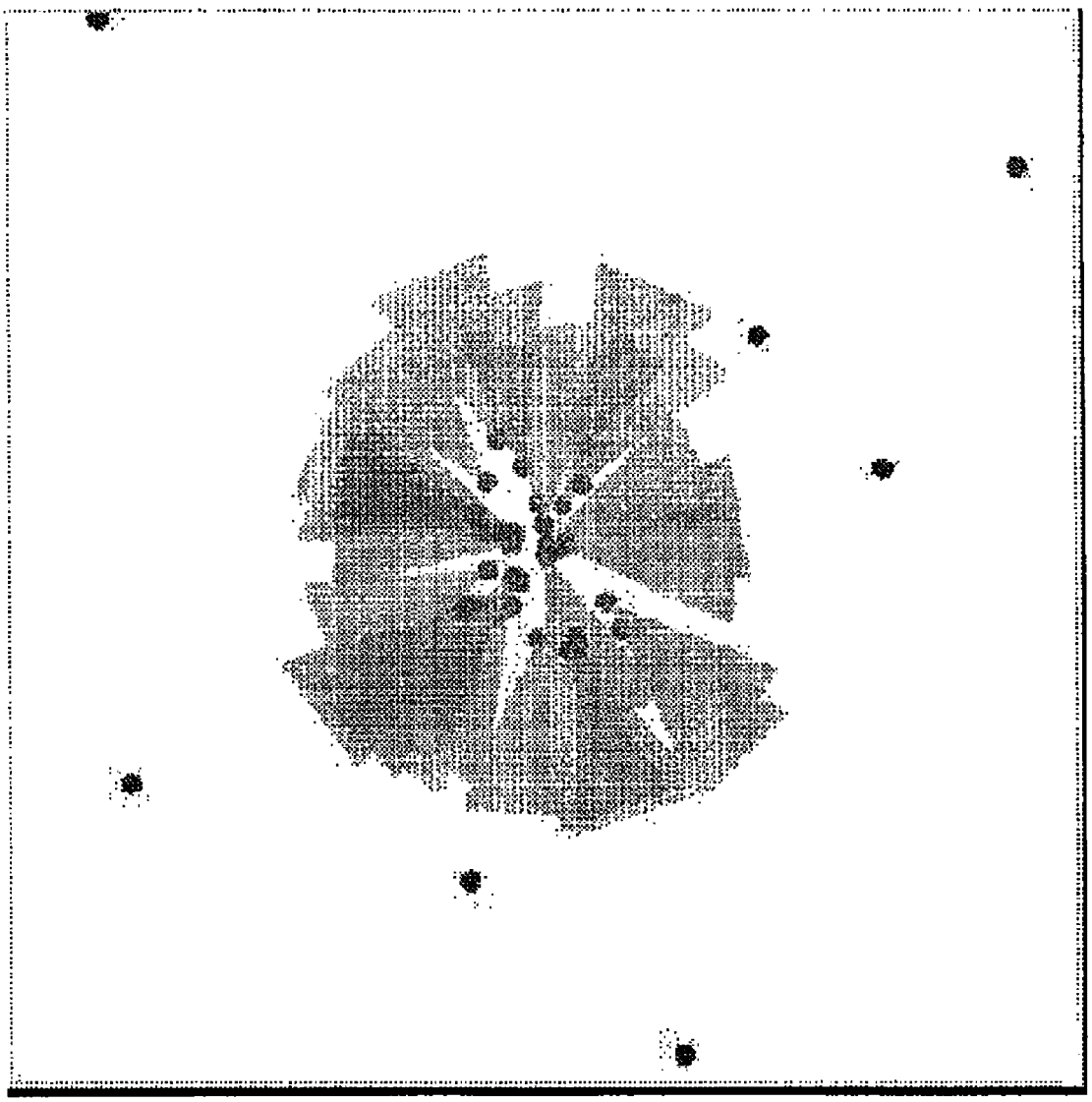
FIG. 16 shows operation simulation results in a dynamic surrounding system according to an embodiment.
Figure 17:
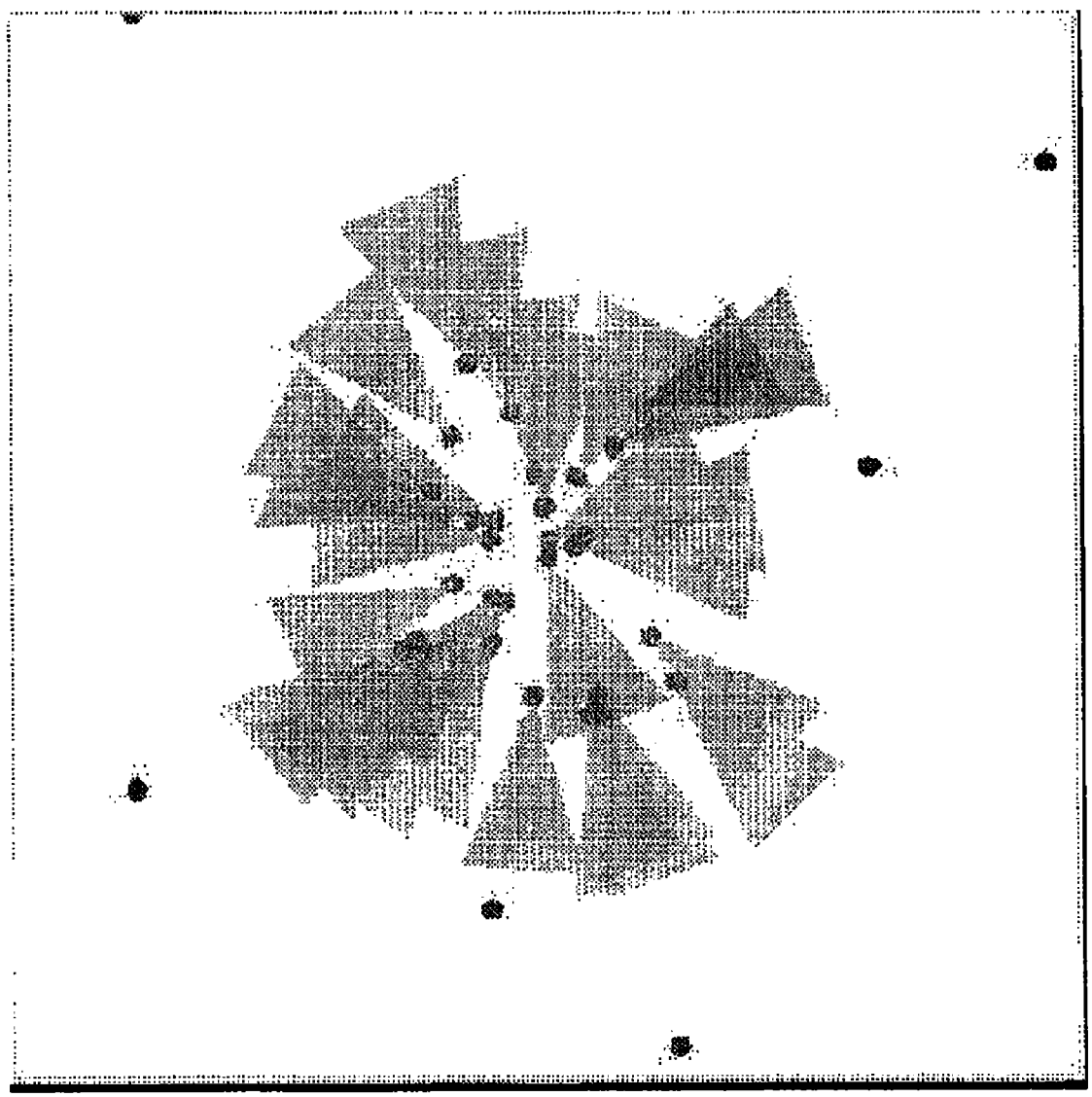
FIG. 17 shows operation simulation results in a dynamic surrounding system according to an embodiment.
Figure 18:
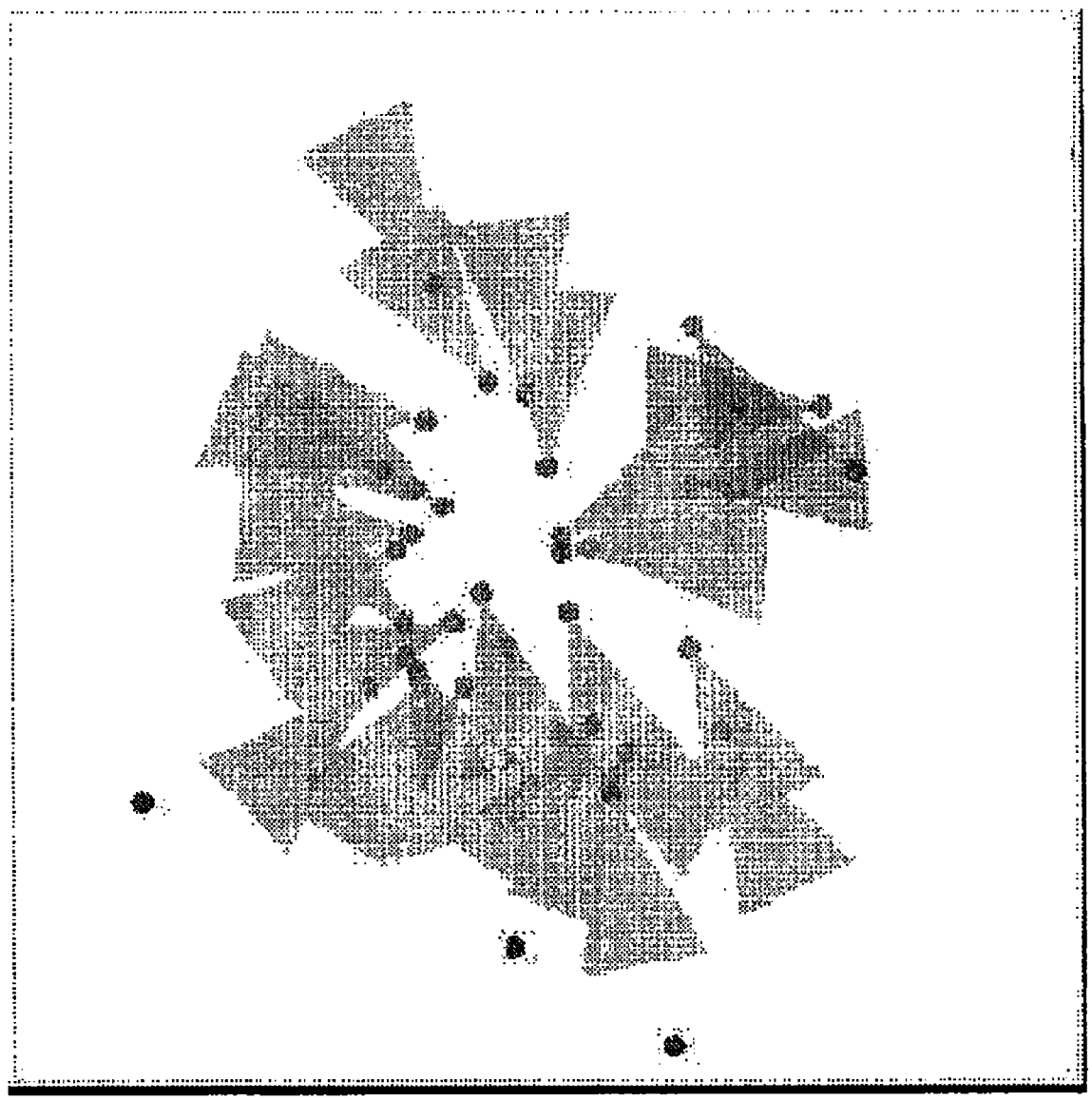
FIG. 18 shows operation simulation results in a dynamic surrounding system according to an embodiment.
Figure 19:
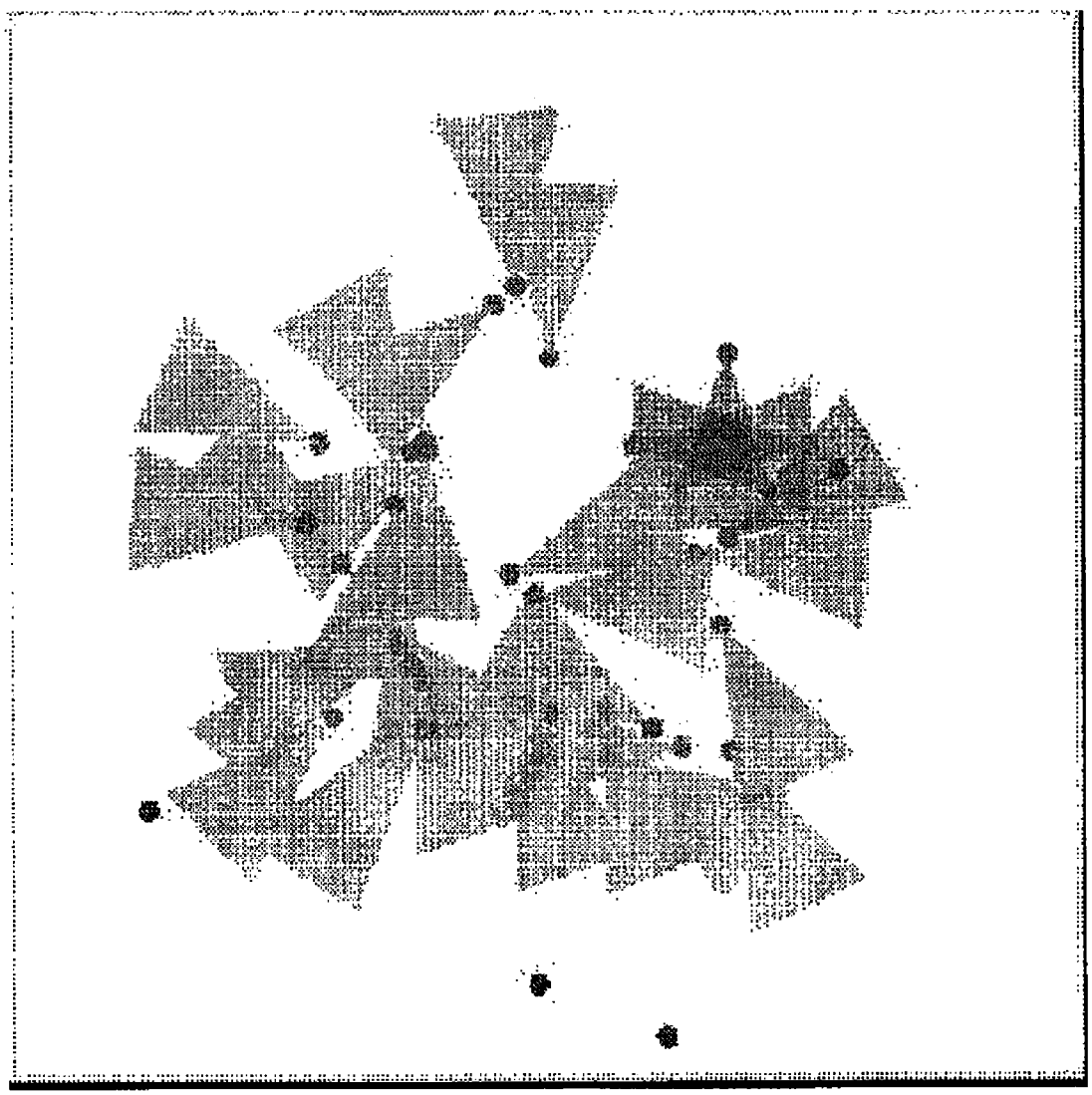
FIG. 19 shows operation simulation results in a dynamic surrounding system according to an embodiment.
Figure 20:
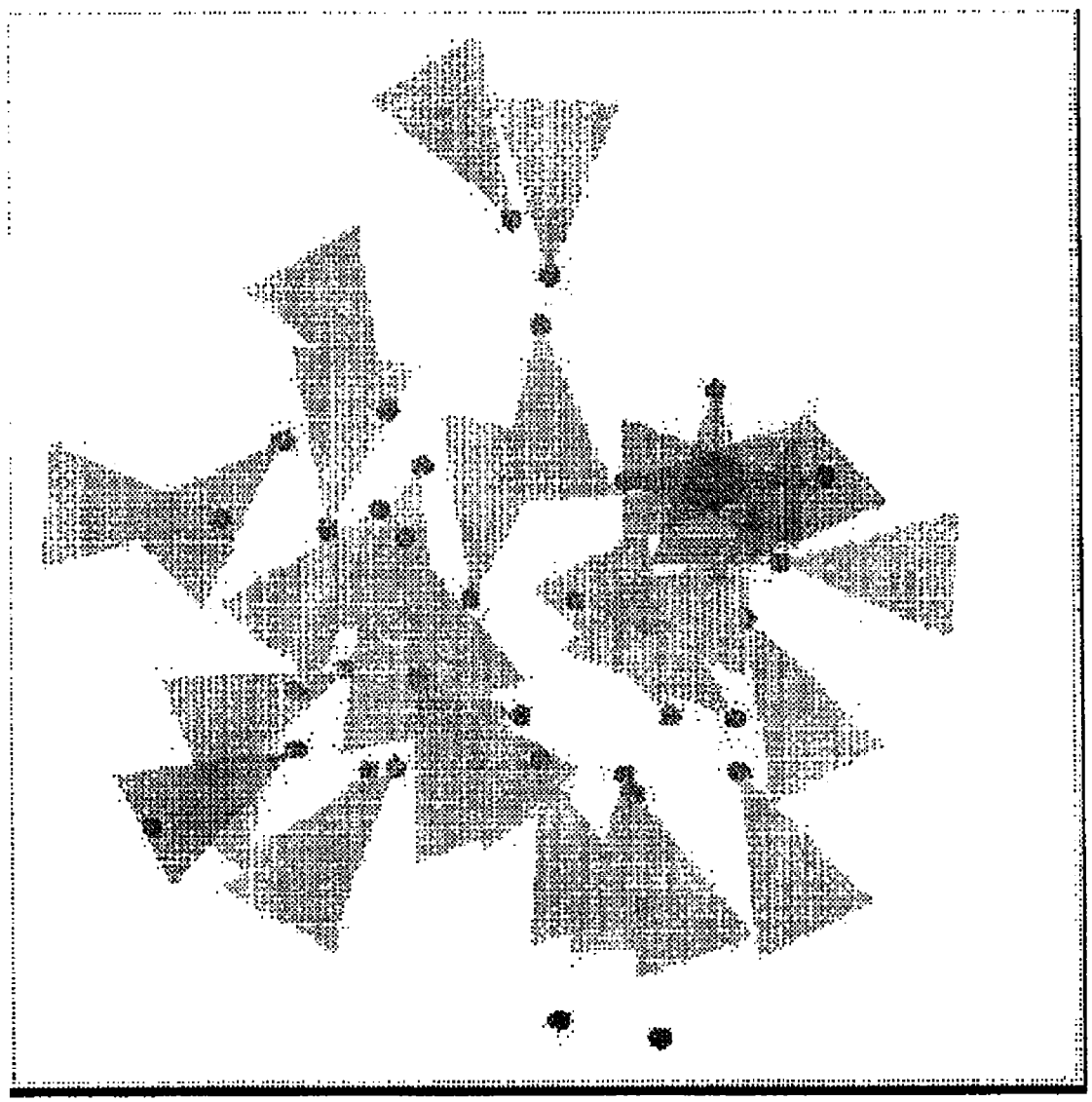
FIG. 20 shows operation simulation results in a dynamic surrounding system according to an embodiment.
Figure 21:
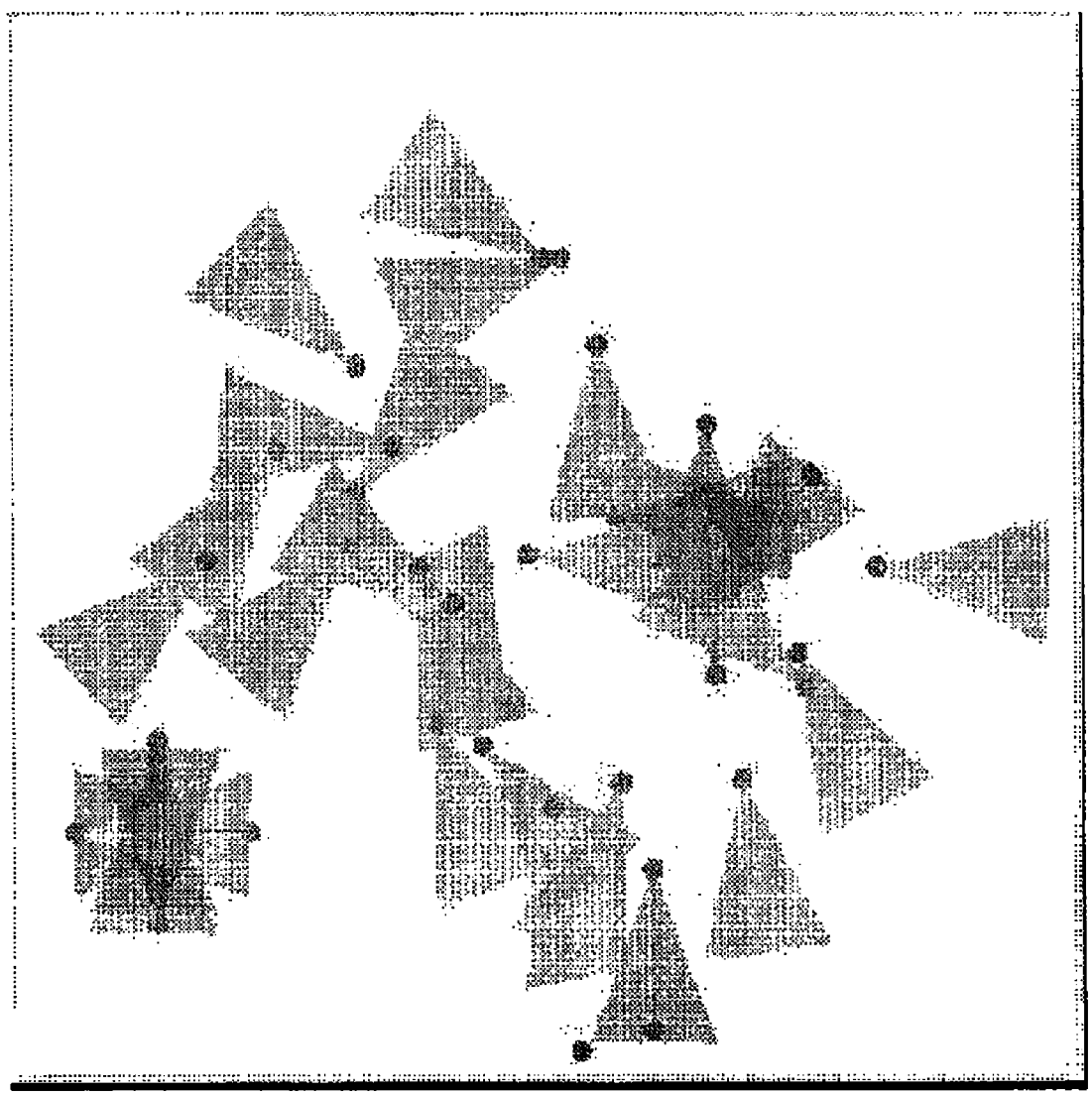
FIG. 21 shows operation simulation results in a dynamic surrounding system according to an embodiment.
Figure 22:
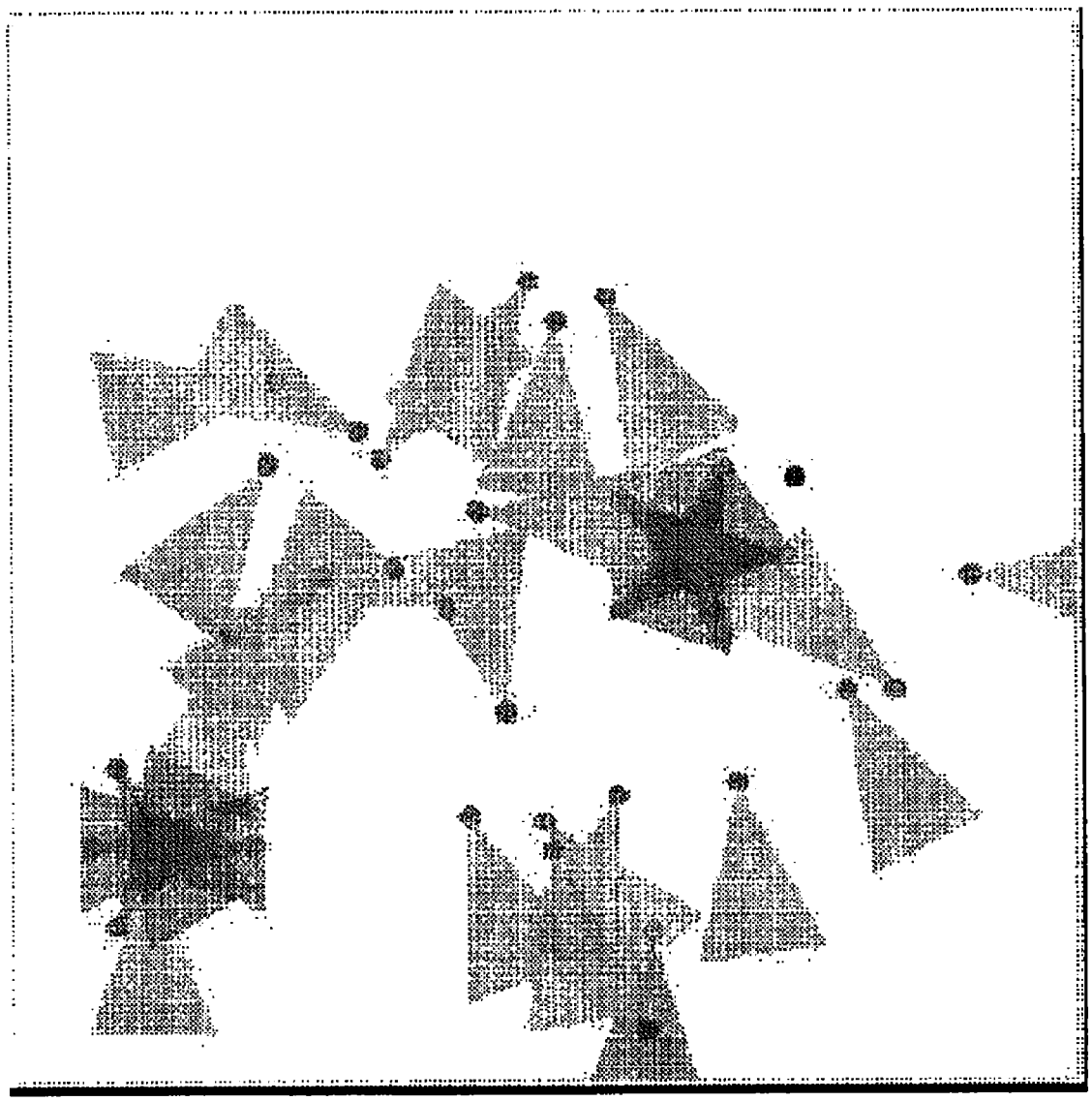
FIG. 22 shows operation simulation results in a dynamic surrounding system according to an embodiment.
Figure 23:
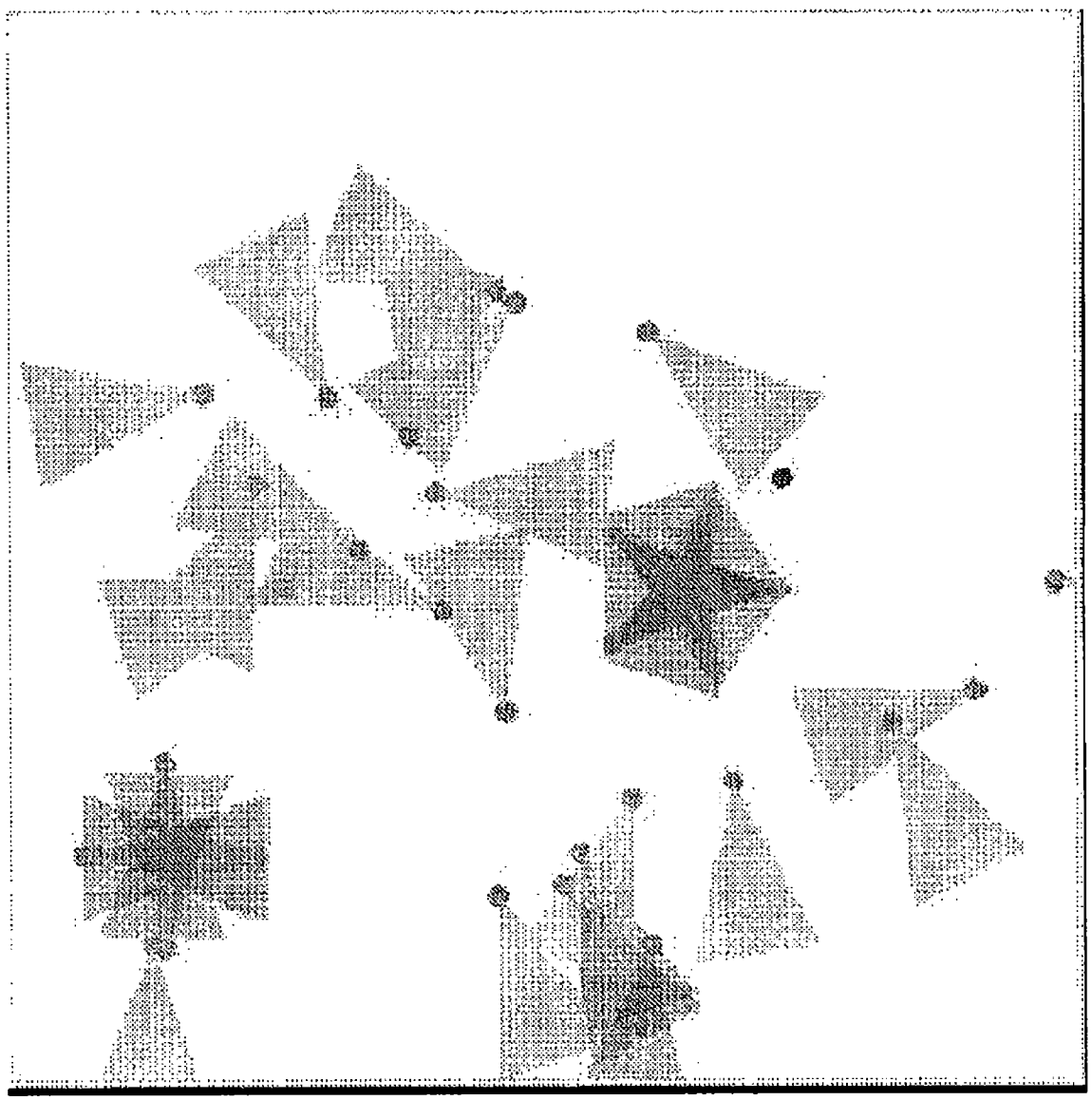
FIG. 23 shows operation simulation results in a dynamic surrounding system according to an embodiment.
Figure 24:
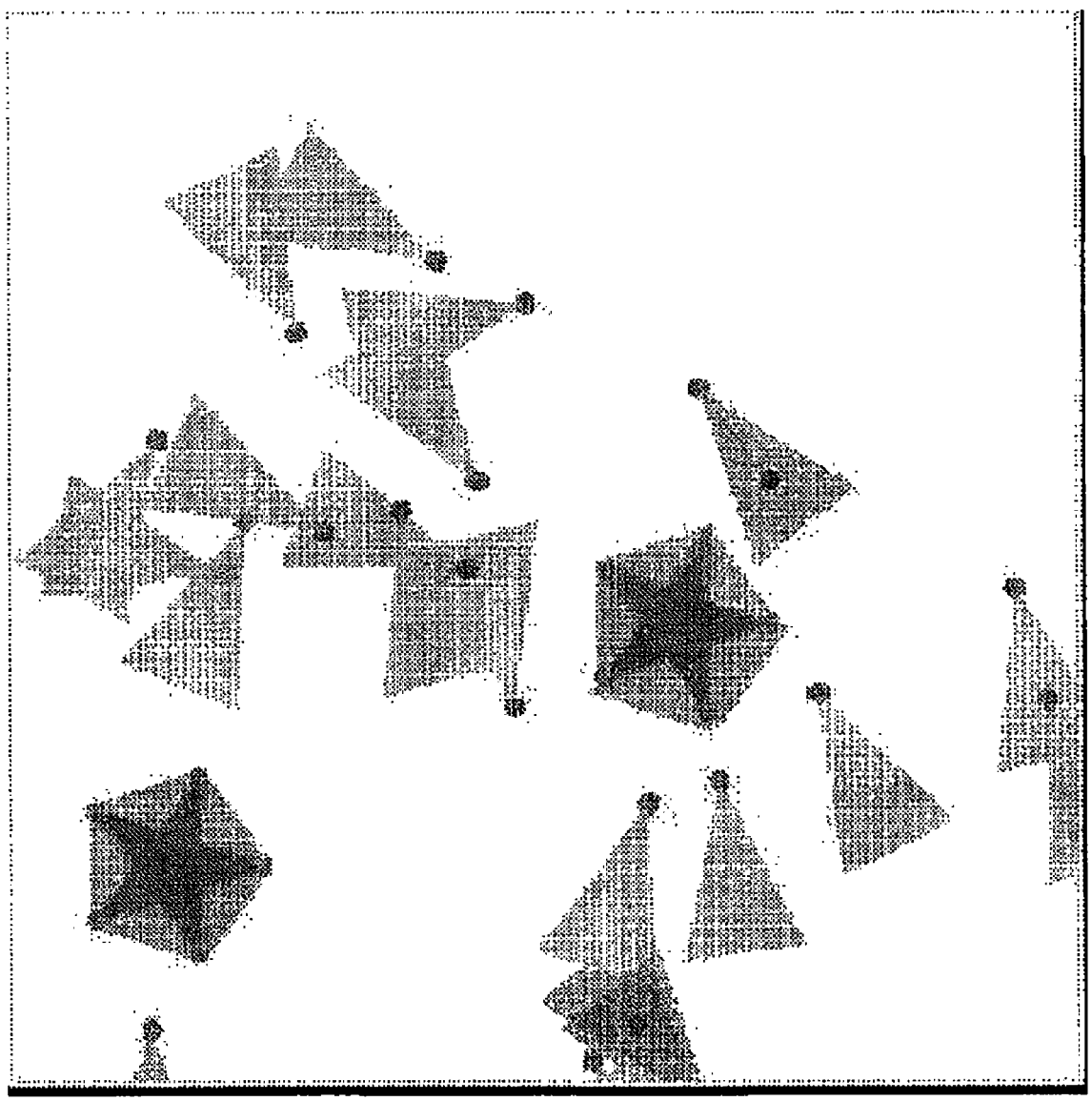
FIG. 24 shows operation simulation results in a dynamic surrounding system according to an embodiment.
Figure 25:
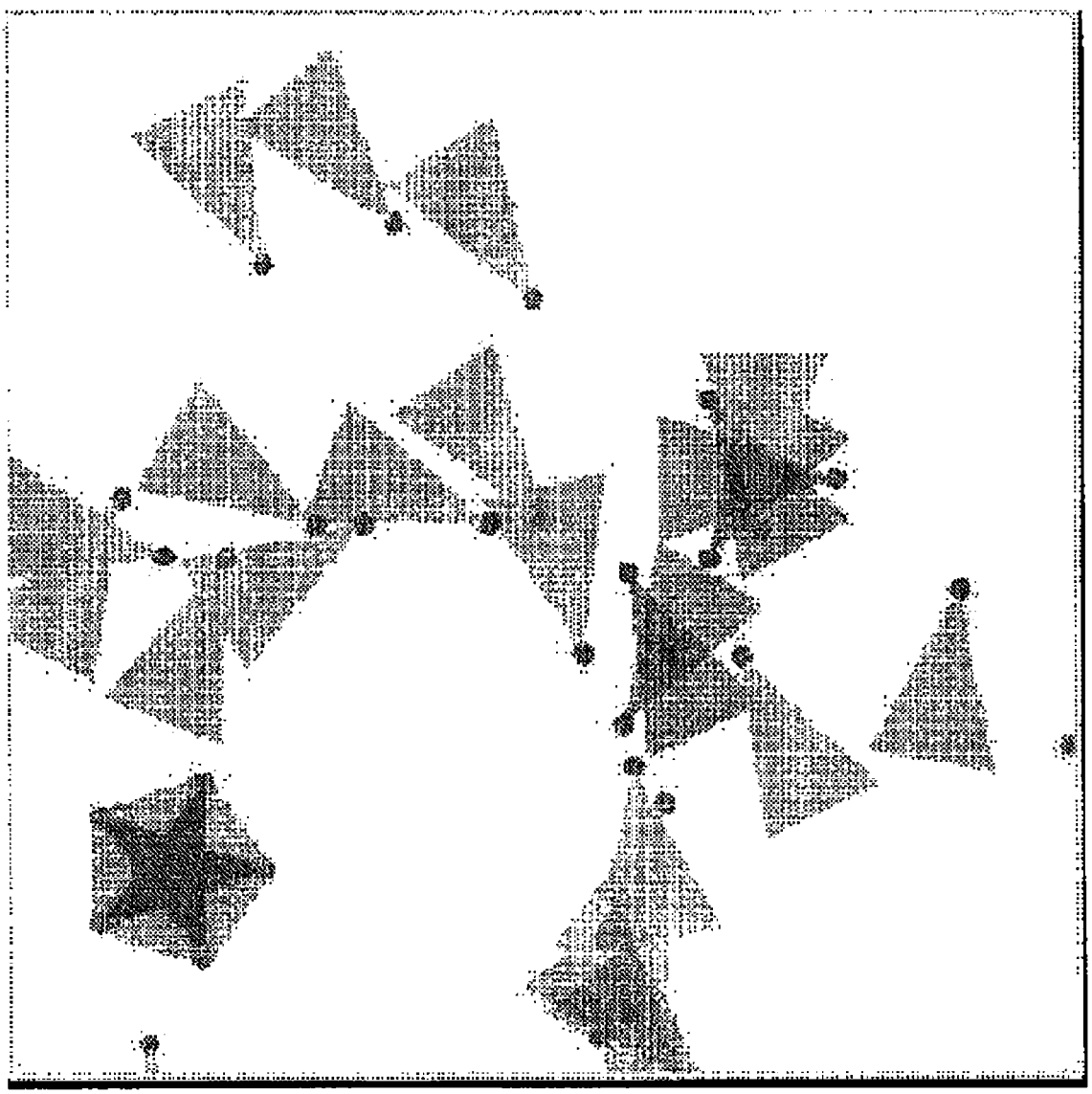
FIG. 25 shows operation simulation results in a dynamic surrounding system according to an embodiment.
Figure 26:
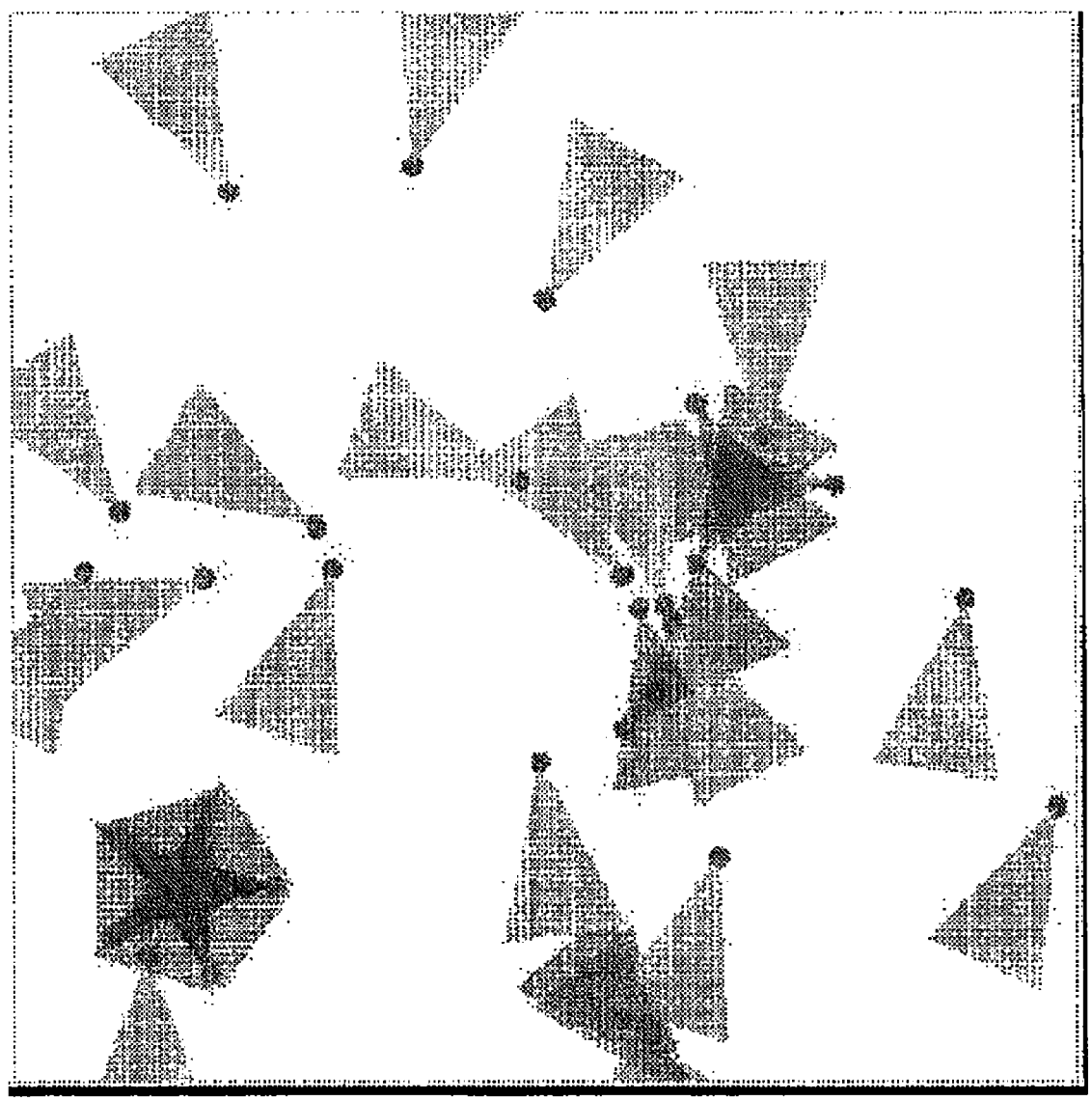
FIG. 26 shows operation simulation results in a dynamic surrounding system according to an embodiment.
Figure 27:
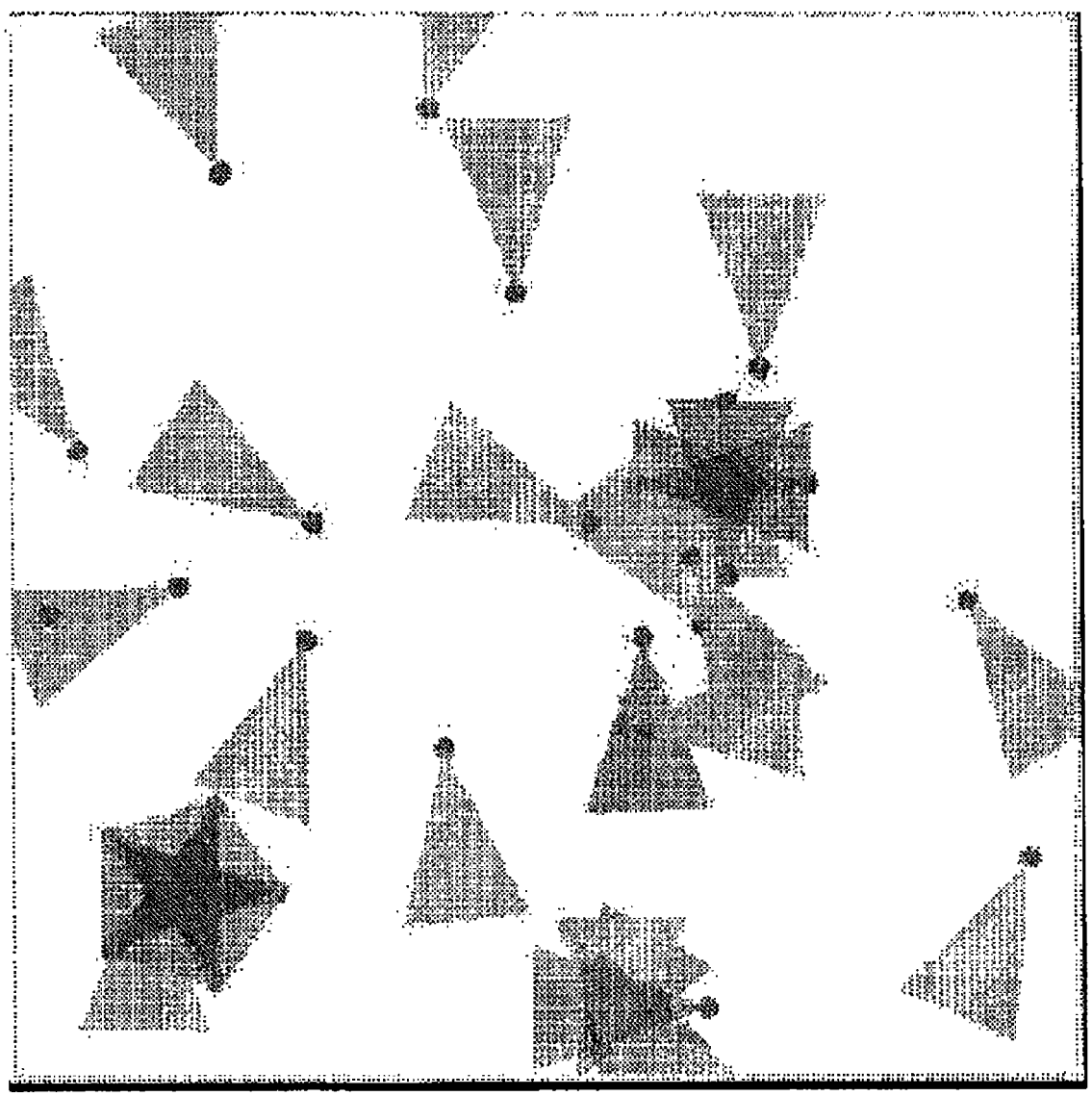
FIG. 27 shows operation simulation results in a dynamic surrounding system according to an embodiment.
Figure 28:
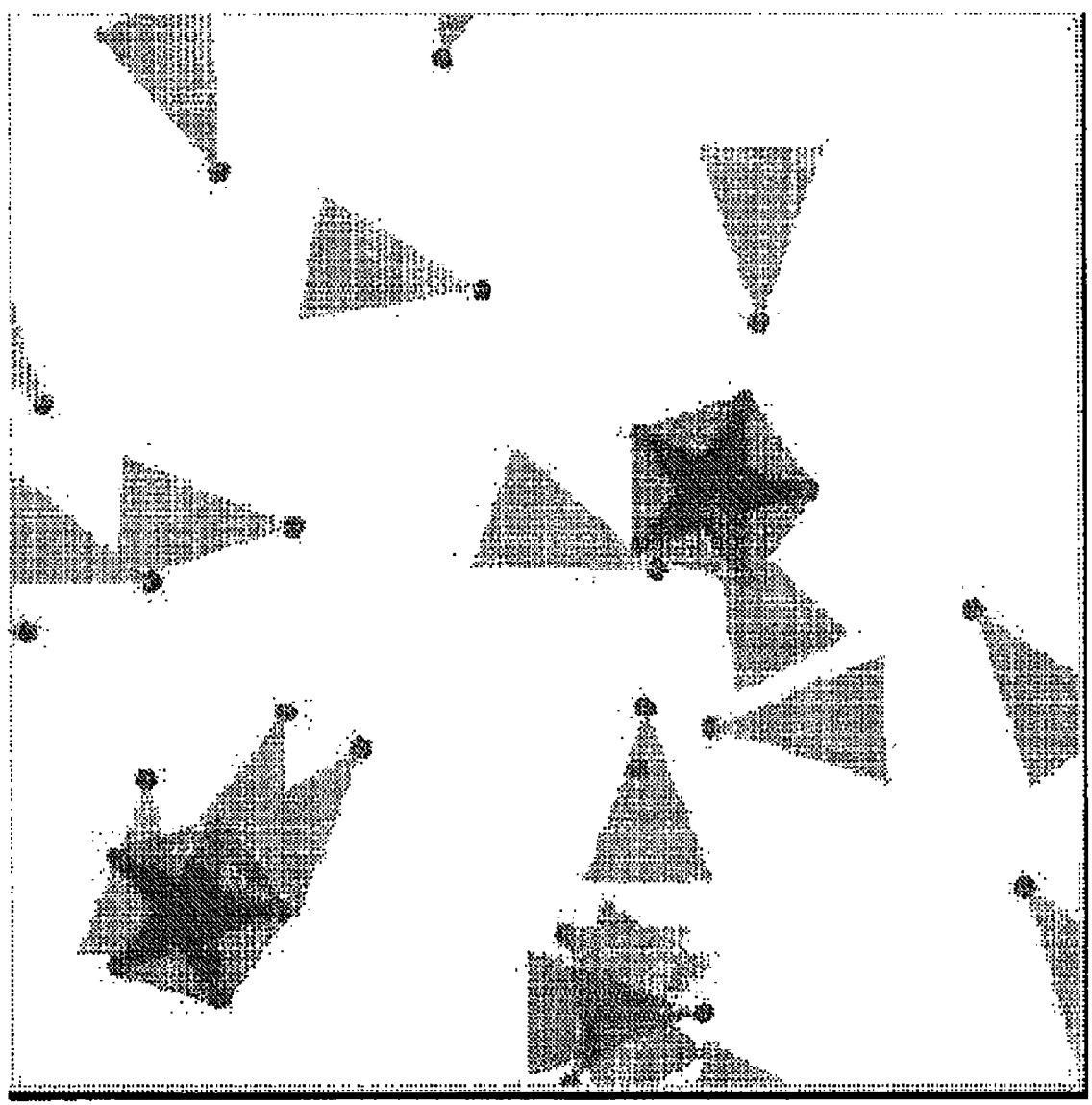
FIG. 28 shows operation simulation results in a dynamic surrounding system according to an embodiment.

Each sensor node during the initial set time enters a search mode and moves by a random walk. At this time, in order that a plurality of distributed sensor nodes perform an effective search, as shown in FIG. 16, the sensor nodes direct their cameras in mutually difference directions, so that the sensing area is maximized.

In such a work space, a plurality of targets are moving. The sensor node that has detected the target in the search mode transmits in broadcast the detection packet, shifts to the tracking mode, and moves by a tracking walk while directing its camera towards the moving target. Furthermore, the sensor node receiving the detection packet from a neighboring sensor node shifts to the detection mode, and attempts to detect the same target by maximizing the similarity with the camera video in which the target is captured while operating the direction of its own camera (see, for example, FIGS. 17 to 19).

Here, in the detection packet, the maximum value of the number of the sensor nodes that focus on the target is described. The sensor node receiving detection packets whose number exceeds the maximum value ignores the detection packet for the target and does not shift to the detection mode. As a result, the number of sensor nodes that detect and track one target is limited, so that the focus of a large number of nodes is not biased to only a specific target.

When the sensor node in the detection mode detects the target, the sensor node also transmits in broadcast the detection packet, shifts to the tracking mode, and moves by a tracking walk while directing its camera towards the moving target.

When the number of sensor nodes that track the same target becomes two or more, a target surrounding process for surrounding the target is performed by coordinated operation. FIGS. 20 to 28 show a state in which a process for surrounding each moving target is performed at several places of a work space.

In the dynamic surrounding system according to this embodiment, a sensor node that tracks a target transmits and receives a radio-wave intensity list to and from each adjacent sensor node, and a movement determination is performed by using a regular polygon model defined by a relative relationship among radio-wave intensities of sensor nodes.

Figure 29:
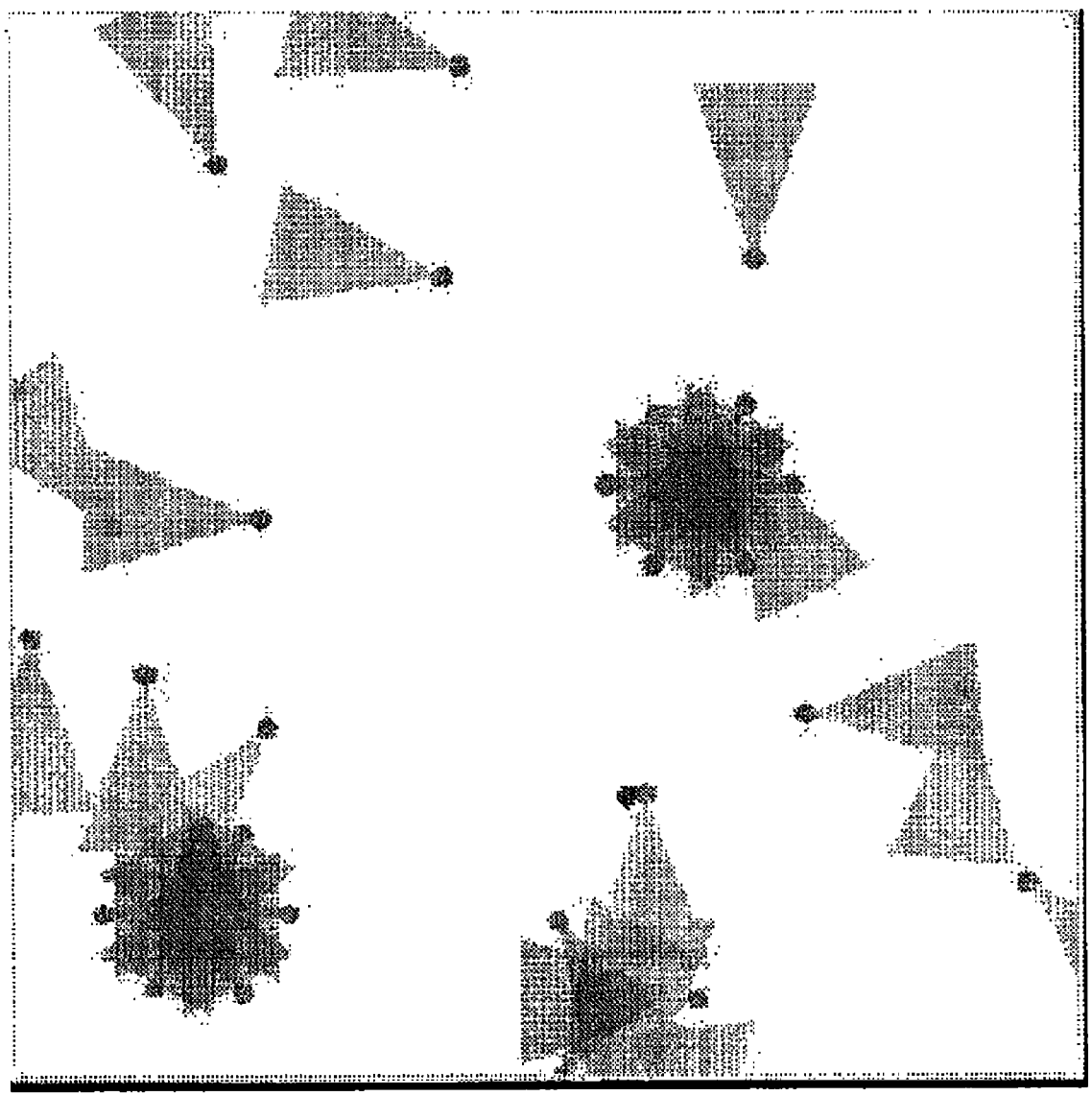
FIG. 29 shows operation simulation results in a dynamic surrounding system according to an embodiment.
Figure 30:
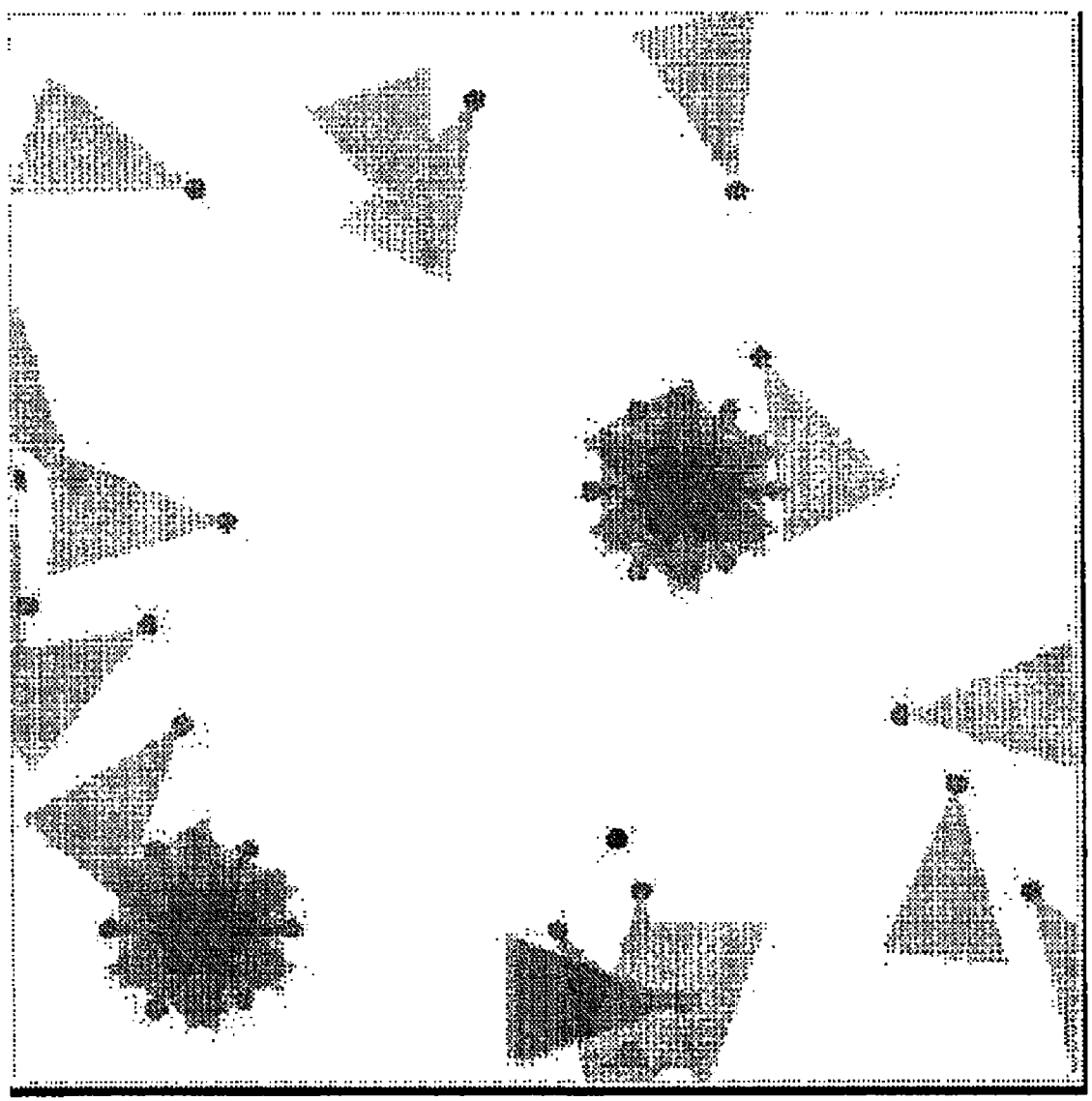
FIG. 30 shows operation simulation results in a dynamic surrounding system according to an embodiment.
Figure 31:
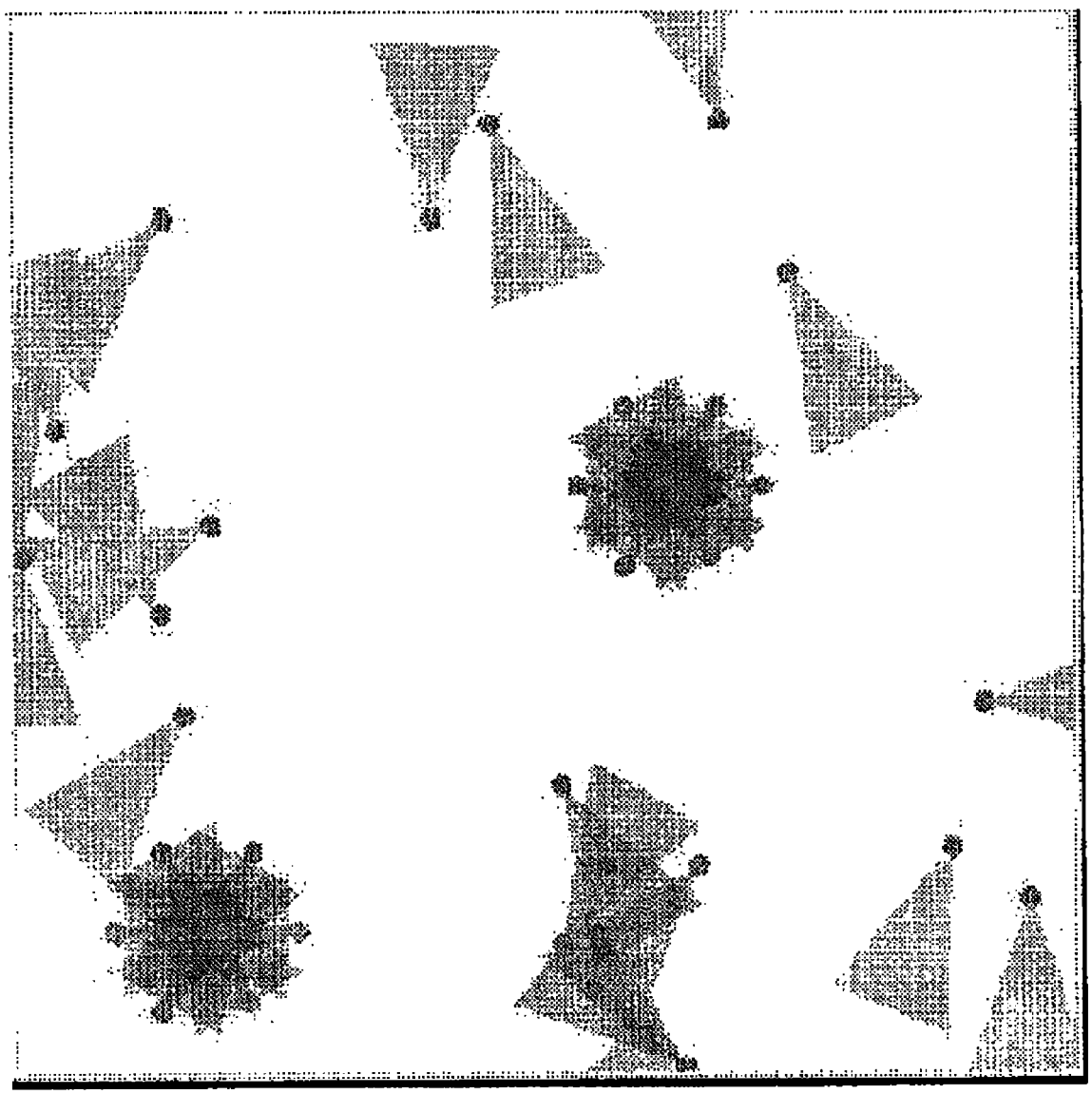
FIG. 31 shows operation simulation results in a dynamic surrounding system according to an embodiment.

FIGS. 29 to 31 show a state in which, at several places of a work space, a maximum number of sensor nodes that track one target forms an ideal regular polygon and track the same target.

When the sensor node loses the sight of the target while moving by tracking, the sensor node returns to the search mode and restarts a random walk. As a result, the sensor node leaves from the node group that has been tracking the same target in such a manner as to surround it. When this target is detected, the sensor node newly joins another node group that tracks another target.

In the dynamic surrounding system according to this embodiment, when the individual sensor nodes are viewed, leaving from and joining each node group that tracks a target is repeated. However, when the overall system is viewed, since each target is surrounded by one of the node groups, sufficient information about the target can be obtained.

The greatest feature of the dynamic surrounding system according to the embodiment of the present invention is that a target is searched for and is surrounded. The search for a target by a moving sensor node is, in itself, a useful application, such as rescuing of people during a disaster, a search for missing persons and missing children, and finding of suspicious persons.

Unlike a camera sensing system of a fixed infrastructure type, according to the dynamic surrounding system of the present invention, high-accuracy sensing from a plurality of angles while moving is possible. Furthermore, not only a rough search for a target by vision, but also an extended application in which a biometric authentication function is installed into a sensor node and a further precise target authentication process is performed, can also be realized.

When a target surrounding process is taken note of, applications of the dynamic surrounding system according to the embodiment of the present invention can be classified into the following two types on the basis of the relationship between a sensor node and a target.

(1) Obtaining Information of a Target

The capability of monitoring a target from many angles has many advantages in obtaining the information of the target. For example, by surrounding the target, it is possible for a camera to obtain three-dimensional texture information. This information is transmitted to a three-dimensional display at another location via a network, where, for example, the information can be used to reproduce a hologram.

(2) Providing Information and Services to the Target

By considering nodes that surround a target as service devices, it is possible to provide a surround space. For example, a five-channel audio space can be realized by surrounding a target by five sensor nodes and by causing audio of a different channel to be generated from the speaker of each sensor node. Furthermore, by connecting the section between adjacent sensor nodes by a directivity sensor, applications, such as guard and protection for important persons, can be realized.

It should be understood by those skilled in the art that various modifications, combinations, sub-combinations and alterations may occur depending on design requirements and other factors insofar as they are within the scope of the appended claims or the equivalents thereof.

The invention is claimed as follows:

1. A network system comprising:
 a plurality of mobile devices each having a moving means and a sensor function and a wireless communication function, the mobile devices communicating sensor information about a target with one another and tracking the target;
 target searching means for obtaining sensor information while the plurality of the mobile devices move, and for reporting the sensor information among the respective mobile devices by wireless communication;
 target detecting means for reporting whether the target has been detected based on sensor information obtained by one of the mobile devices or for attempting to detect the same target in response to information received that the target has been detected by one of the mobile devices;
 target focusing means for, in response to one of the mobile devices detecting a target, focusing a sensor on the target in cooperation with respective mobile devices adjacent to the mobile device detecting said target;
 target surrounding means for surrounding the target by using a plurality of mobile devices that focus their respective sensors on the same target; and
 wherein the target detecting means describes a maximum value of a number of mobile devices in a packet that reports that the target has been detected on the basis of the obtained sensor information, or ignores a report that the target has been detected from the mobile devices whose number exceeds the maximum value when the report is received.

2. The network system according to claim 1, wherein the target searching means moves each mobile device on the basis of a predetermined index.

3. The network system according to claim 1, wherein each mobile device comprises a camera to provide the sensor function, and the target searching means causes video information of the camera in each mobile device to be reported to one another.

4. The network system according to claim 3, wherein each mobile device comprises one or more sensors other than the camera to provide the sensor function, and the target searching means attempts to detect a target by using a combination of the video information from the camera and other sensor information in each respective mobile device.

5. The network system according to claim 3, wherein the target searching means operates the camera of each respective mobile device so that the similarity between the video information of the cameras in each mobile device is minimized and maximizes a sensing area of the system.

6. The network system according to claim 3, wherein the target focusing means attempts to detect the same target by maximizing the similarity between video information from cameras in neighboring mobile devices.

7. The network system according to claim 1, wherein the target focusing means limits the number of mobile devices that focus their sensors on one target.

8. The network system according to claim 1, further comprising distance estimation means for estimating a relative distance between mobile devices,
wherein the target surrounding means determines whether or not the target can be surrounded on the basis of information on the relative distances between mobile devices whose sensors are focused on the same target, the relative distances being estimated by the distance estimation means, and causes each mobile device to move on the basis of the determination result.

9. The network system according to claim 8, wherein each mobile device transmits a wireless signal that is attenuated in proportion to a distance, and the distance estimation means estimates a relative distance between mobile devices on the basis of radio-wave intensity information of a signal received by each mobile device.

10. The network system according to claim 8, wherein the target surrounding means determines whether or not the target can be surrounded on the basis of whether or not the information on the relative distance between mobile devices matches a desired regular polygon model.

11. The network system according to claim 1, further comprising target setting means for statically or dynamically setting a target to be searched by the target searching means.

12. The network system according to claim 11, wherein the target setting means allows the dynamically set target to be broadcast by using a wireless communication function in each mobile device in accordance with flooding using multihop or in accordance with another data distribution protocol.

13. The network system according to claim 11, wherein the target setting means sets, as a target, a moving object detected by the sensor function of a particular mobile device.

14. A mobile device that has a sensor function and a wireless communication function, that operates as a communication node on a wireless network, and that tracks a target by communicating sensor information with other communication nodes, the mobile device comprising:
moving means;
target searching means for obtaining sensor information while the mobile device is moved using the moving means and for reporting the sensor information among neighboring communication nodes;
target detecting means for reporting whether the target has been detected on the basis of sensor information obtained by the mobile device to neighboring communication nodes or for attempting to detect the same target in response to information received that the target has been detected by a neighboring communication node;
target tracking means for tracking the target detected on the basis of the sensor information obtained by the mobile device while focusing a sensor of the mobile device on the target; and
wherein the target detecting means describes a maximum value of the number of communication nodes in a packet that reports that the target has been detected on the basis of the sensor information obtained by the mobile device, or ignores a report that the target has been detected from the communication nodes whose number exceeds the maximum value when the report is received.

15. The mobile device according to claim 14, wherein the target searching means moves using the moving means on the basis of a predetermined index.

16. The mobile device according to claim 14, further comprising a camera providing a sensor function,
wherein the target searching means and neighboring communication nodes report video information of the camera to one another.

17. The mobile device according to claim 16, further comprising, as a sensor function, one or more sensors other than the camera,
wherein the target searching means attempts to detect a target by using a combination of the video information of the camera and other sensor information in each respective mobile device.

18. The mobile device according to claim 16, wherein the target searching means operates the camera of the mobile device so that the similarity between video information sent from a neighboring communication node and the video information of the mobile device is minimized, and maximizes a sensing area formed with neighboring communication nodes.

19. The mobile device according to claim 16, wherein the target detecting means operates the camera of the mobile device so that the similarity between video information sent from a neighboring communication node and the video information of the mobile device is maximized, and attempts to detect the same target as that of the neighboring communication node.

20. The mobile device according to claim 14, wherein the target tracking means surrounds the target in cooperation with neighboring nodes that track the same target.

21. The mobile device according to claim 20, further comprising distance estimation means for estimating a relative distance to neighboring communication nodes,
wherein the target tracking means determines whether or not the target can be surrounded on the basis of information of the relative distance to each communication node whose sensor is focused on the same target, the relative distance being estimated by the distance estimation means, and controls the movement operation by the moving means on the basis of the determination result.

22. The mobile device according to claim 21, wherein the mobile device transmits a wireless signal that is attenuated in proportion to a distance by the communication function, and the distance estimation means estimates a relative distance to each communication node on the basis of radio-wave intensity information of a signal received from a neighboring communication node.

23. The mobile device according to claim 21, wherein the target tracking means determines whether or not the target can be surrounded on the basis of whether or not the information of the relative distance to each respective communication node whose sensor is focused on the same target matches a desired regular polygon model.

24. The mobile device according to claim 14, further comprising target setting means for statically or dynamically setting a target to be searched by the target searching means.

25. The mobile device according to claim 24, wherein the target setting means broadcasts the dynamically set target to neighboring communication nodes on the wireless network in accordance with flooding using multi-hop or in accordance with another data distribution protocol.

26. The mobile device according to claim 24, wherein the target setting means sets, as a target, a moving object detected by the sensor function.

27. A network system comprising:
a plurality of mobile devices each having a moving means and a sensor function and a wireless communication function, the mobile devices communicating sensor information about a target with one another and tracking the target;
a target searching means configured to obtain sensor information while the plurality of the mobile devices move and for reporting the sensor information among the mobile devices by wireless communication;
a target detecting means for reporting whether the target has been detected based on sensor information obtained by one of the mobile devices or for attempting to detect the same target in response to information received that the target has been detected by one of the mobile devices;
a target focusing means configured to, in response to one of the mobile devices detecting a target, focus a sensor on the target in cooperation with mobile devices adjacent to the mobile device detecting the target;
a target surrounding means configured to surround the target by using a plurality of mobile devices that focus their respective sensors on the same target; and
wherein the target detecting means describes a maximum value of a number of mobile devices in a packet that reports that the target has been detected on the basis of the obtained sensor information, or ignores a report that the target has been detected from the mobile devices whose number exceeds the maximum value when the report is received.

28. A mobile device that has a sensor function and a wireless communication function, that operates as a communication node on a wireless network, and that tracks a target by communicating sensor information with other communication nodes, the mobile device comprising:
a moving means;
a target searching means configured to obtain sensor information while the mobile device is moving using the moving means and for reporting the sensor information among neighboring communication nodes;
a target detecting means configured to report the fact that the target has been detected on the basis of sensor information obtained by the mobile device to neighboring communication nodes or for attempting to detect the same target in response to received information that the target has been detected from a neighboring communication node;
a target tracking means configured to track the target detected on the basis of the sensor information obtained by the mobile device while focusing a sensor of the mobile device on the target; and
wherein the target detecting mean describes a maximum value of the number of communication nodes in a packet that reports that the target has been detected on the basis of the sensor information obtained by the mobile device, or ignores a report that the target has been detected from the communication nodes whose number exceeds the maximum value when the report is received.

29. A mobile device that has a sensor function and a wireless communication function, that operates as a communication node on a wireless network, and that tracks a target by communicating sensor information with other communication nodes, the mobile device comprising:
moving means;
target searching means for obtaining sensor information while the mobile device is moved using the moving means and for reporting the sensor information among neighboring communication nodes;
target detecting means for reporting whether the target has been detected on the basis of sensor information obtained by the mobile device to neighboring communication nodes or for attempting to detect the same target in response to information received that the target has been detected by a neighboring communication node;
target tracking means for tracking the target detected on the basis of the sensor information obtained by the mobile device while focusing a sensor of the mobile device on the target, wherein the target tracking means surrounds the target in cooperation with neighboring nodes that track the same target; and
distance estimation means for estimating a relative distance to neighboring communication nodes,
wherein the target tracking means determines whether or not the target can be surrounded on the basis of information of the relative distance to each communication node whose sensor is focused on the same target, the relative distance being estimated by the distance estimation means, and controls the movement operation by the moving means on the basis of the determination result.

30. The mobile device according to claim 29, wherein the target searching means moves using the moving means on the basis of a predetermined index.

31. The mobile device according to claim 29, further comprising a camera providing a sensor function,
wherein the target searching means and neighboring communication nodes report video information of the camera to one another.

32. The mobile device according to claim 29, wherein the mobile device transmits a wireless signal that is attenuated in proportion to a distance by the communication function, and the distance estimation means estimates a relative distance to each communication node on the basis of radio-wave intensity information of a signal received from a neighboring communication node.

33. The mobile device according to claim 29, wherein the target tracking means determines whether or not the target can be surrounded on the basis of whether or not the information of the relative distance to each respective communication node whose sensor is focused on the same target matches a desired regular polygon model.

34. The mobile device according to claim 29, further comprising target setting means for statically or dynamically setting a target to be searched by the target searching means.

35. A mobile device that has a sensor function and a wireless communication function, that operates as a communication node on a wireless network, and that tracks a target by communicating sensor information with other communication nodes, the mobile device comprising:
a moving means;
a target searching means configured to obtain sensor information while the mobile device is moving using the moving means and for reporting the sensor information among neighboring communication nodes;
a target detecting means configured to report the fact that the target has been detected on the basis of sensor information obtained by the mobile device to neighboring communication nodes or for attempting to detect the same target in response to received information that the target has been detected from a neighboring communication node; and
a target tracking means configured to track the target detected on the basis of the sensor information obtained by the mobile device while focusing a sensor of the mobile device on the target, wherein the target tracking means surrounds the target in cooperation with neighboring nodes that track the same target; and
a distance estimation means for estimating a relative distance to neighboring communication nodes,
wherein the target tracking means determines whether or not the target can be surrounded on the basis of information of the relative distance to each communication node whose sensor is focused on the same target, the relative distance being estimated by the distance estimation means, and controls the movement operation by the moving means on the basis of the determination result.

* * * * *